(12) United States Patent
Cox et al.

(10) Patent No.: US 12,479,373 B1
(45) Date of Patent: Nov. 25, 2025

(54) DELIVERY VEHICLE WITH SENSORS HAVING OVERLAPPING FIELD OF VIEWS

(71) Applicant: Amazon Technologies, Inc., Seattle, WA (US)

(72) Inventors: Dylan Thomas Cox, Shoreline, WA (US); Matthieu Liger, Seattle, WA (US); Scott Malcolm Waters, Rye, NH (US); Alexander M Frenkel, Seattle, WA (US); Seth Whittington, Bothell, WA (US); Nicholas Mendenhall, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 557 days.

(21) Appl. No.: 17/948,403

(22) Filed: Sep. 20, 2022

(51) Int. Cl.
| | |
|---|---|
| B60R 11/04 | (2006.01) |
| H04N 23/50 | (2023.01) |
| H04N 23/51 | (2023.01) |
| H04N 23/57 | (2023.01) |
| B60R 11/00 | (2006.01) |

(52) U.S. Cl.
CPC .............. *B60R 11/04* (2013.01); *H04N 23/50* (2023.01); *H04N 23/51* (2023.01); *H04N 23/57* (2023.01); *B60R 2011/004* (2013.01)

(58) Field of Classification Search
None
See application file for complete search history.

(56) References Cited

U.S. PATENT DOCUMENTS

| | | | | |
|---|---|---|---|---|
| 2016/0239978 A1* | 8/2016 | Cole | ................... | G06T 7/557 |
| 2019/0248421 A1* | 8/2019 | Jacobsthal | ............ | B62D 25/06 |
| 2021/0206329 A1* | 7/2021 | Hamlin | ................... | B60R 11/04 |
| 2021/0239461 A1* | 8/2021 | Illes | ..................... | G01B 11/272 |
| 2021/0302541 A1* | 9/2021 | Fields | ................... | H05K 7/14 |

* cited by examiner

*Primary Examiner* — Eileen M Adams
(74) *Attorney, Agent, or Firm* — Kilpatrick Townsend & Stockton LLP

(57) ABSTRACT

A delivery vehicle with sensors having overlapping fields of view is described herein. In an example, a cargo bay is mounted to a chassis. A sensor system is mounted to the cargo bay and includes a plurality of cameras that have a first collective 360° field of view along a first plane and that form pairs of adjacent cameras. The cameras in each one of the pairs have overlapping fields of view along the first plane. The sensor system also includes a plurality of light sources configured to emit collectively light along the first collective 360° field of view. A first light source of the plurality of light sources is mounted adjacent to a first camera of the plurality of cameras.

20 Claims, 26 Drawing Sheets

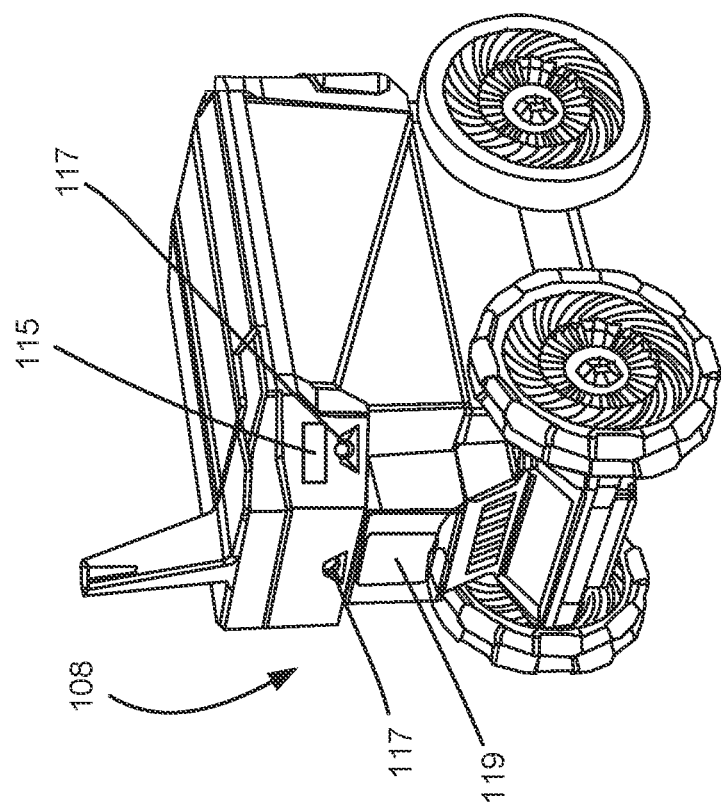
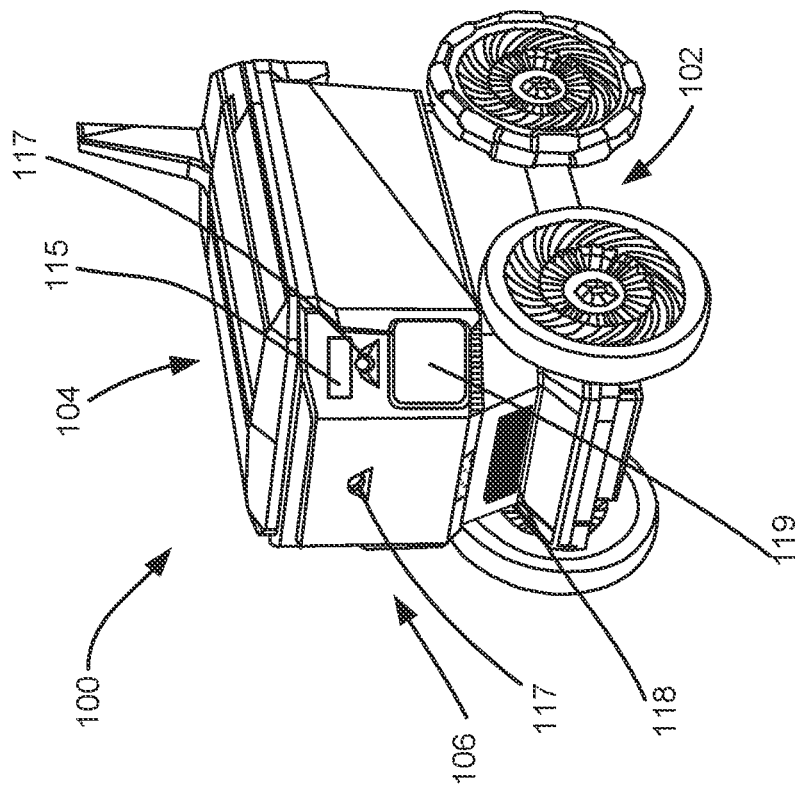
FIG. 1

DELIVERY VEHICLE WITH SENSORS HAVING OVERLAPPING FIELD OF VIEWS

BACKGROUND

Items may be moved from one location to another, such as for delivery at a particular location. Typically, delivering items is accomplished by human personnel. Recently, industry effort has been made to consider robotic devices.

BRIEF DESCRIPTION OF THE DRAWINGS

Various embodiments in accordance with the present disclosure will be described with reference to the drawings, in which:

FIG. 1 illustrates perspective views of an example of a delivery vehicle with sensors according to an embodiment of the present disclosure;

DETAILED DESCRIPTION

Figure 2:
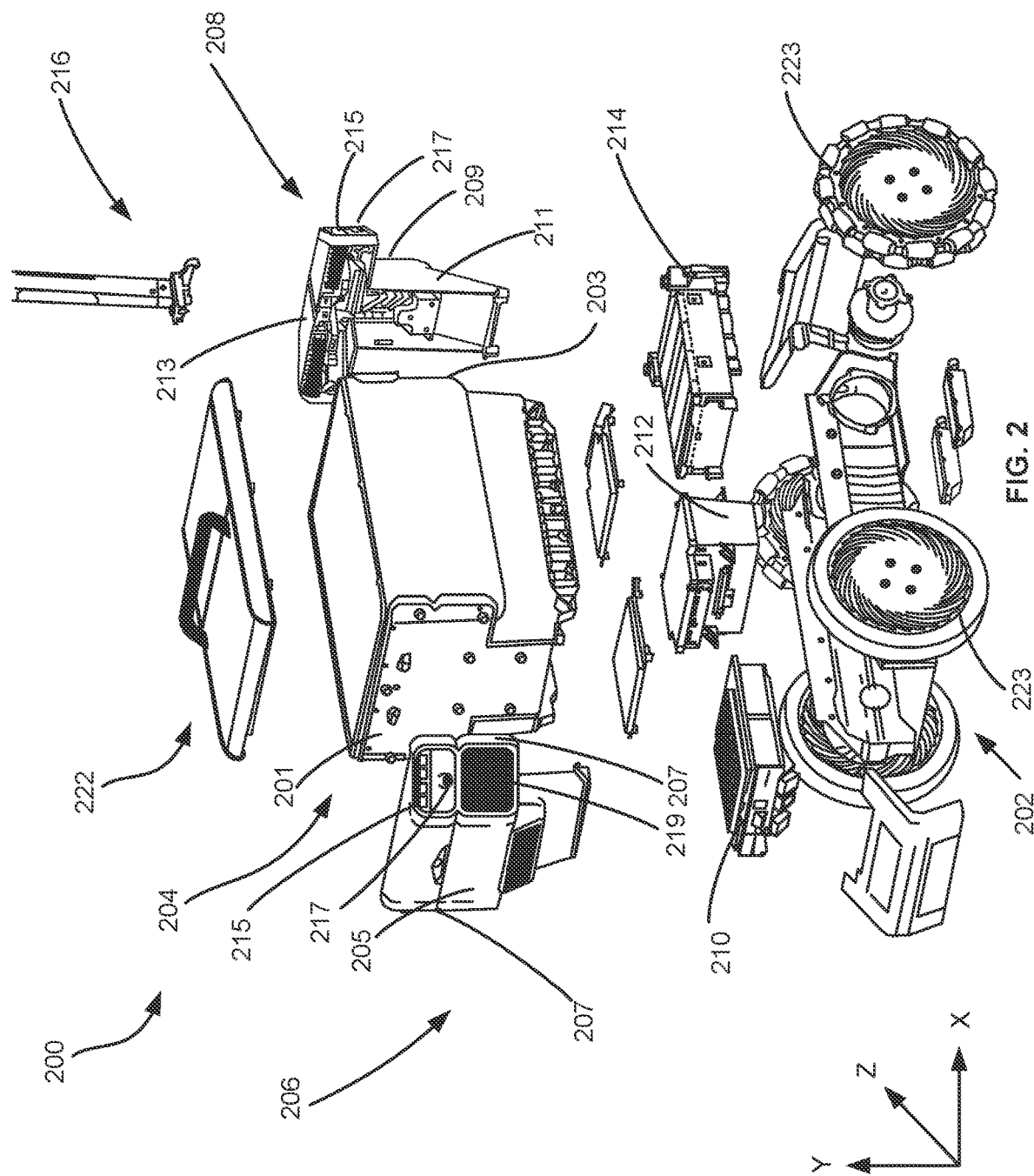
FIG. 2 illustrates an exploded view of an example of a delivery vehicle with sensors according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a delivery vehicle with sensors having overlapping fields of view. The delivery vehicle includes a chassis, a cargo bay mounted to the chassis, and a sensor system mounted to the cargo bay. The sensor system can include a set of cameras that have a collective 360° field of view along a plane (e.g., a horizontal plane). Cameras in the set of cameras can form pairs of adjacent cameras, and cameras in each one of the pairs have overlapping fields of view along the plane. In addition, the sensor system can include a set of light sources that collectively emit light along the collective 360° field of view. Each light source may be mounted adjacent to a camera. The sensor system can also include one or more radars and a light detection and ranging (LiDAR) sensor also mounted relative to the light sources and cameras.

To illustrate, consider an unmanned delivery vehicle for delivering items to delivery locations. A cargo bay can store the items during movement to the delivery locations. A sensor system can include front and back sensor systems that are mounted to a front side and back side of the cargo bay, respectively. The sensor system can include six cameras, four light sources, three radars, and a LiDAR. For example, the front sensor system and the back sensor system can each include three cameras and two light sources. The front sensor system can also include two radars and the LiDAR, while the back sensor system includes one radar. The distribution of the cameras, light sources, and radar can result in a collective horizontal 360° field of view for the cameras, the light sources, and the radar. The sensor systems can be coupled to a connector unit in a chassis of the delivery vehicle. The connector unit can be electrically coupled to a field replaceable unit and a power storage unit that are also in the chassis. The field replaceable unit and the connector unit can include printed circuit boards providing the compute for the delivery vehicle.

Embodiments of the present disclosure provide several technical advantages over conventional delivery vehicles. For example, the arrangement of cameras and light sources of the delivery vehicle can provide improved mobility and safety. In addition, the delivery vehicle includes a LiDAR for redundancy and to generate three-dimensional ground terrain data that can improve performance of the delivery vehicle. The delivery vehicle also includes unobstructed radars, which can provide power and efficacy improvements compared to conventional delivery vehicles since the radars do not have to penetrate an extra layer in front of the radars.

FIG. 1 illustrates perspective views of an example of a delivery vehicle 100 with sensors according to an embodiment of the present disclosure. The delivery vehicle 100 may be used to deliver items to locations. For instance, the delivery vehicle 100 may be loaded with one or more items that are to be transported to one or more locations, and the delivery vehicle 100 can travel to the one or more locations to deliver the items. The delivery vehicle 100 includes a computer system that is capable of supporting various computing services including, for instance, controlling light sources, cameras, radars, movement, door positioning, and item dispensing. In particular, the computer system includes one or more processors, and one or more memories storing computer-readable instructions for an item dispensing service.

To illustrate, at the beginning of an operational day, the delivery vehicle 100 can be located in a home base, having completed battery charging and data offload from a previous operational day. An operator can transport items to the home base, load the delivery vehicle 100 with the items, and associate the delivery vehicle 100 with the items to enable assignment of the correct expedition to the delivery vehicle 100. Once loaded with the items for the expedition, the delivery vehicle 100 can receive the expedition plan from remote systems, autonomously egress from the home base, navigate the expedition path to each delivery location, and back to the home base at the end. Once arriving back at the home base, the delivery vehicle 100 can autonomously ingress, dock, and begin charging and data offload of relevant collected data.

The delivery vehicle 100 may be operable in various control modes. For example, in an autonomous, machine monitored mode, the delivery vehicle 100 can autonomously navigate an expedition path while being automatically monitored for faults and errors by a computer system (e.g., a remote system and/or a computer system of the delivery vehicle 100). In the autonomous, machine monitored mode, human oversight or in-the-loop assistance may be eliminated. In an autonomous, tele-monitored mode, the delivery vehicle 100 can autonomously navigate an expedition path while being tele-monitored by an operator, who can intervene in case of a hazard. In a teleoperation mode, the delivery vehicle 100 can be controlled remotely by an operator. The operator can have control over the speed and direction of travel of the delivery vehicle 100. In a local joystick mode, the delivery vehicle 100 can be controlled locally by an operator through a joystick. The operator can have control over the speed and direction of travel of the delivery vehicle 100.

To support the attended delivery model, the delivery vehicle 100 may have operational and technical specifications suited for particular delivery operations. The operational and technical specifications may vary for different delivery vehicles can relate to a traveling distance per day, travel speed, time length of operations, battery recharging speed, overall dimensions, load holding capability, and weight requirements.

As illustrated, the delivery vehicle 100 includes a chassis 102, a cargo bay 104, a front sensor system 106, and a back sensor system 108. The cargo bay 104 is mounted to the chassis 102. The cargo bay 104 can hold and protect items after they have been loaded into the delivery vehicle 100, and also to enable retrieval of the items upon arrival of the delivery vehicle 100 at a destination. In support of retrieval under low-light conditions, the cargo bay 104 may be illuminated for easy viewing. As illustrated herein below, the cargo bay 104 includes a front side to which the front sensor system 106 is mounted and a back side to which the back sensor system 108 is mounted. Each of the chassis 102, the front sensor system 106, and the back sensor system 108 includes sensing and/or lighting components for the delivery vehicle 100. For instance, the front sensor system 106 and the back sensor system 108 include light sources 115, cameras 117, and radars 119. In addition, the front sensor system 106 also includes a light detection and ranging (LiDAR) sensor. The cameras 117 and the radars 119 can each have a collective 360° field of view, as further described herein below.

FIG. 2 illustrates an exploded view of an example delivery vehicle 200 with sensors according to an embodiment of the present disclosure. The delivery vehicle 200 includes a chassis 202, a cargo bay 204, a front sensor system 206, a back sensor system 208, and a mast 216. The mast 216 can be mounted to the chassis 202 and/or the cargo bay 204 via the back sensor system 208 (e.g., via its housing). The chassis 202 can include a field replaceable unit 210 of a main electronics assembly, a connector unit 212, thermal management components, drivetrain components, a power storage unit 214, and cable management components for electrical cables extending from the connector unit 212 to all other systems of the delivery vehicle 200. The cargo bay 204 can be located in an upper portion of the delivery vehicle 200 and can include a lid assembly 222. Lifting the lid assembly 222 can expose a recessed area of the cargo bay 204. The cargo bay 204 serves to physically locate, support and mount sensor systems, including audio and lighting, of the delivery vehicle 200. The cargo bay 204 may be a single molded part with datum pins and busses in the front and rear to locate and attach front sensor pockets. Two stiff structural members run from front to rear of the tub, which also feature mounting holes to connect the cargo bay 204 to the chassis 202. The cargo bay 204 may have a ridged base but the geometry towards the top is open and flexible. When attached to the lid assembly 222, the cargo bay 204 becomes rigid at the top. The lid assembly 222 can include a communications printed circuit board, a lid control printed circuit board, cargo lighting sources, and a hinge and latch mechanism. Interfaces between the various sub-systems are robust to allow flexibility for updates. From a mechanical perspective, the architecture is modular in that the field replaceable unit 210, the cargo bay 204, the lid assembly 222, and the sensor systems can be updated as long as the mounting and cabling interfaces are maintained.

The cargo bay 204 can be mounted to the chassis 202. For instance, the cargo bay 204 may be mounted to the chassis 202 along a first plane, such as an X-plane or a horizontal plane. The cargo bay 204 includes a front side 201 and a back side 203. The front sensor system 206 can be mounted to the front side 201 along a second plane, such as a Y-plane or a vertical plane, that intersects the first plane. In addition, the back sensor system 208 can be mounted to the back side 203 along the second plane. The mast 216 can also be mounted to the back side 203 of the cargo bay 204 through at least a top surface 213 of the back sensor system 208.

In an example, the front sensor system 206 can include a housing that includes a front wall 205 that is parallel to the front side 201 and angled walls 207 that intersect the front wall 205 and the front side 201. The back sensor system 208 can include a housing that includes a back wall 209 that is parallel to the back side 203 and angled walls 211 (one shown in FIG. 2) that intersect the back wall 209 and the back side 203. The front sensor system 206 and the back sensor system 208 can form a collective sensor system that includes cameras 217, light sources 215, and radars 219. The sensor system may include any suitable number of cameras 217 that have a first collective 360° field of view along the first plane (e.g., X-plane). As an example, the sensor system may include six cameras that form pairs of adjacent cameras. The cameras 217 in each pair can have overlapping fields of view along the first plane. The sensor system may also include a number of light sources 215 capable of emitting light along the first collective 360° field of view. As an example, the sensor system can include four light sources (e.g., light emitting diode (LED) light sources) that are mounted adjacent to four cameras of the cameras 217. The light sources 215 can vertically output light in specified zones. A main illumination zone can be pointed down from horizontal to the ground adjacent to the delivery vehicle 200 and up to ten meters beyond. A second illumination zone can be angled upward, but at a lower intensity to reduce glare for people nearby while still providing adequate illumination for the cameras 217. A narrow transition zone may be specified between the two. The color temperature may be compliant with automotive industry practice, whereby the light emitting diodes can be automotive grade. The intent of the two zones can include providing a high brightness visibility to distant drivers and pedestrians and a reduced brightness visibility as they approach the delivery vehicle 200. The sensor system may also include a number of radars 219 mounted adjacent to the cameras 217. As an example, the sensor system can include three radars that have a second collective 360° field of view along the first plane (e.g., X-plane).

The chassis 202 can include a field replaceable unit 210, a connector unit 212, and a power storage unit 214. The chassis 202 is torsionally flexible but becomes adequately stiff when fastened to the power storage unit 214, the field replaceable unit 210, and the cargo bay 204. The design of the power storage unit 214 and the field replaceable unit 210 are enclosed to avoid water ingress to protect sensitive electronics from mechanical stresses, which makes them stiff. The cargo bay 204, which has stiff geometry on the bottom, lends rigidity to the chassis 202 as well. The connector unit 212 can be disposed between the field replaceable unit 210 and the power storage unit 214. Each of the field replaceable unit 210, the connector unit 212, and the power storage unit 214 can include a waterproof-sealable enclosure. The field replaceable unit 210 can be any spare part that can be replaced in field during the life of the product and can include a set of printed circuit boards and a first connector that is electrically coupled with the set of printed circuit boards. In addition, the connector unit 212 can include another set of printed circuit boards that have connectors that receive electrical cables. The connector unit 212 can further include a second connector that mates with the first connector and electrically couples to the electrical cables via the other set of printed circuit boards. The power storage unit 214 can include a set of batteries for powering the connector unit 212, the field replaceable unit 210, the front sensor system 206, and the back sensor system 208.

In an example, the lid assembly 222 can include a frame, a front lid, and a rear lid. The front lid and the rear lid can make up a bi-fold lid that opens from front to back by the front lid sliding along rails. The front lid can include a handle located in the center of the lid. The front lid includes pins on a front edge and latches on the rear edge. The front pins can be removed easily allowing the lid to be rotated out of the way and provide easier access to the rear lid. Both the pins and the latches interface with the track in the frame. The lid may also include a center hinge that allows the two halves of the lid to fold in the center while channeling water to the edges and keeping the cargo bay 204 dry. The design of the center hinge removes a potential pinch point where the front lid and the rear lid meet.

The lid can hold itself in the open position so that two hands can be used to remove items from the cargo bay 204. The lid can either be closed by a user or auto-closed by the delivery vehicle 200. Auto-closing the lid may be passive, meaning that the lid does not actuate the auto-close, but movement of the delivery vehicle 200 does. The rear lid can hinge at the back of the frame and house the communications printed circuit board.

The frame can attach to the cargo bay 204 and provide structure for the lid assembly 222. The lid frame can also act as the mounting structure for the cargo bay lighting sources, lid control printed circuit board, and hold-open and auto-close mechanism. The lid assembly 222 includes the lid control printed circuit board that is connected directly to the connector unit 212. The lid control printed circuit board controls the latches, cargo bay lighting sources, auto-close mechanism, and reads the sensors for the lid position and latch status. The cargo bay lighting sources may be two light emitting diode strips attached to the underside of the lid. A cable harness can run between the lid control printed circuit board and the peripherals.

The communications printed circuit board can be connected to a carrier with one or more screws. The shape of the communications printed circuit board can allow testing above the rear sensor pocket in addition to the lid. If the communications printed circuit board stays in the lid, a layout of communications printed circuit board may be modified to optimize for easier mounting using fewer screws, better connector placement, and a more compact size. A more compact size may allow the latches to move to the rear lid.

Locomotion of the delivery vehicle 200 is achieved from locomotion wheel modules 223 each integrating an electric machine, a motor controller, an angular position sensor, and a mechanical brake for safety and parking. A central sync control of the locomotion wheel modules 223 contains compute, controller area network with flexible data-rate (CAN-FD) controllers and transceivers, logic power, motor power, safety braking solid-state power disconnect, power sequencing, traction control and diagnostics. The locomotion wheel modules 223 are each commanded via a dedicated CAN-FD bus for each locomotion wheel module 223.

A primary command mode sends target torque values, and a velocity control mode is also available as a tertiary function. Commands for mechanical brake state, free-wheeling operation mode and braking to stop by electric machine are also available. Each locomotion wheel module 223 reports computed angular velocity, position, time, brake status, and any errors.

The wheels of the locomotion wheel modules can have any suitable diameter, such as three-hundred fifty mm. Each wheel may be driven by an independently controlled high speed motor. A fail-safe friction brake before the gear reduction can rapidly bring the delivery vehicle 200 to a stop if commanded or power is cut. An integrated motor controller on each motor module allows high speed control loops to execute at the device, needing only power and CAN communication to the central controller. The wheels can provide obstacle climbing capability while foam tires and compliant spokes allow for low cost shock absorption and vibration damping. Omni-wheels on the rear of the delivery vehicle 200 allow for low power and more deterministic turning leveraging the designs and success of the previous generation Omni-wheels. No additional steering mechanism is required and the delivery vehicle 200 can achieve a zero turn radius with no skidding.

The wheels provide multiple functionalities: structural support of the entire delivery vehicle mass to the ground, traction for driving, climbing and stopping by transmitting torque from the motors to the ground, and compliance and damping for mechanical shock reduction and vibration absorption. In addition, the rear wheels Omni-wheels allow for low power and low wear turning without additional steering mechanisms or skid steering. One means of shock absorption and vibration damping from terrain inputs is through flexible elements in the wheel structure.

In an example, the wheels include a central rigid hub that mounts to the motor output, a band of flexible spokes in a spiral that absorb shocks, and the tire or Omni-roller carrier assembly. Even if the deflection behavior is different between a flexible tire and a more rigid Omni-roller carrier assembly, the flexible spoke geometry and the wheel mounting interface can be virtually the same.

The motor unit can be a single module that includes the motor, gear reduction, a fail-safe brake, and the distributed motor controllers. The motor is mounted by a vertical flange on the chassis 202 with a wheel mounting hub protruding externally and the motor controller side being internal. A short, larger diameter motor can allow for more room between the motors for batteries, compute, or other items. Long, narrow motors may impact the internal volume of the delivery vehicle 200 available for these items and may necessitate a larger gear reduction, reducing efficiency. Even flatter or direct drive motors may require more steel and copper to achieve torque requirements of the larger wheels. The motor to chassis interface can include a flange, four-bolt pattern and a sealing gasket. A flat on the flange guarantees the correct orientation of the motor for correct connector orientation internally.

In an example, a fail-safe brake can be integrated with each motor. In the event of power loss or another critical failure, the brake can engage and rapidly bring the delivery vehicle 200 to a stop. This is also the brake that prevents the delivery vehicle 200 from rolling when it is parked on a slope without power to the motors. The motor brake mechanism may only have two states, on and off and stops the robot suddenly if used.

The gear reduction can be positioned between the motor and the wheel. By using the gear reduction, a smaller brake can be used to stop the motor, transmitting the stopping torque through the gear reduction. The smaller brake in turn allows for the use of an industry standard electromagnetic friction brake. When the electromagnet of the brake is powered, the load on the friction disc of the brake is relieved, allowing the shaft of the motor to spin freely. When power is cut, a series of springs return and load the friction disc, stopping rotation of the motor shaft.

Figure 3:
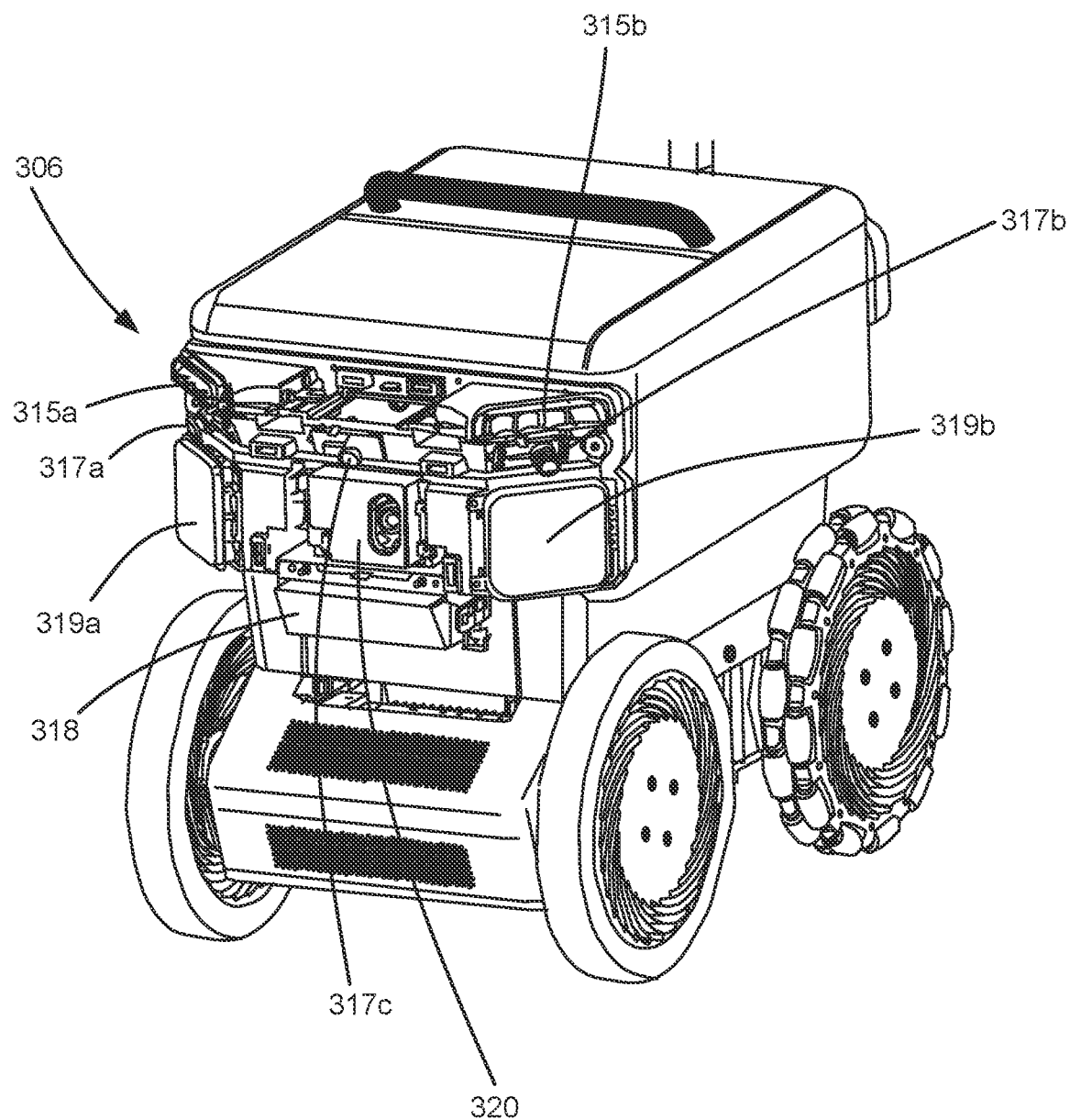
FIG. 3 illustrates an example of a front sensor system of a delivery vehicle according to an embodiment of the present disclosure.

FIG. 3 illustrates an example of a front sensor system 306 of a delivery vehicle (e.g., delivery vehicle 100 in FIG. 1) according to an embodiment of the present disclosure. The front sensor system 306 can include a housing, which is not shown in FIG. 3. The housing includes a front wall and a first angled wall. The first angled wall includes a first light source 315*a*, a first camera 317*a*, and a first radar 319*a* installed in corresponding openings in the first angled wall of the housing. The first radar 319*a* may be unobstructedly installed in the opening of the housing, meaning that the first radar 319*a* can be free of any cover, including a cosmetic cover that may be radio-frequency transparent in the range of radio frequencies that the first radar 319*a* uses. As illustrated, the first radar 319*a* can be mounted below the first camera 317*a*, and the first light source 315*a* can be mounted above the first camera 317*a*, but the first camera 317*a*, the first radar 319*a*, and the first light source 315*a* may be positioned differently with respect to each other.

In an example, the housing also includes a second angled wall that includes a second light source 315*b*, a second camera 317*b*, and a second radar 319*b* installed in corresponding openings in the second angled wall. The second radar 319*b* can be mounted below the second camera 317*b*, and the second light source 315*b* can be mounted above the second camera 317*b*. The second radar 319*b* can also be unobstructedly installed in the opening of the housing. The housing can have a third camera 317*c* and LiDAR 318 installed in corresponding openings in a front wall of the housing, and the LiDAR 318 can be mounted below the third camera 317*c*. In addition, the housing includes a sound module 320 mounted between the third camera 317*c* and the LiDAR 318. The second light source 315*b*, the second camera 317*b*, the second radar 319*b*, the third camera 317*c*, the LiDAR 318, and the sound module 320 may be positioned differently within the housing in other examples. As an example, the LiDAR 318 can run off a 9V to 16V power supply (e.g., 14V system), provided from a field replaceable unit through a cable terminated with a connector, and nominally consumes 15 W of power. Data is fed to the field replaceable unit over the same cable with 100/1000BASE-T1 automotive standard at an effective data rate of one Gb/s, for instance.

Each of the cameras 317*a-c* may be a monocular camera, and camera lenses of each of the cameras 317*a-c* can be oriented downwardly. In addition, the cameras 317*a-c* and additional cameras of a back sensor system (e.g., back sensor system 108 in FIG. 1) can form overlapping pairs of adjacent cameras and the cameras in each pair can have overlapping fields of view. The cameras 317*a-c* and the additional cameras have a collective 360° field of view along a horizontal plane. As an example, the cameras 317 can run off a 10V to 16V power supply (e.g., 14V system), provided by the field replaceable unit through GMSL2, and nominally consumes 4 W of power. Output data is fed to the field replaceable unit through a GMSL2 interface at rates of up to 5.2 Gb/s, for instance.

The radars 319*a-b* and at least one additional radar of the back sensor system also have a collective 360° field of view along the horizontal plane. As an example, the radars 319 can run off a 10V to 16V power supply (e.g., 14V system), provided by the field replaceable unit through a cable terminated with a connector, with each nominally consuming 10 W of power. Output data is fed to the field replaceable unit over the same cable, a 100 BASE-T1 automotive standard at a nominal data rate of one-hundred Mb/s, for instance.

Figure 4:
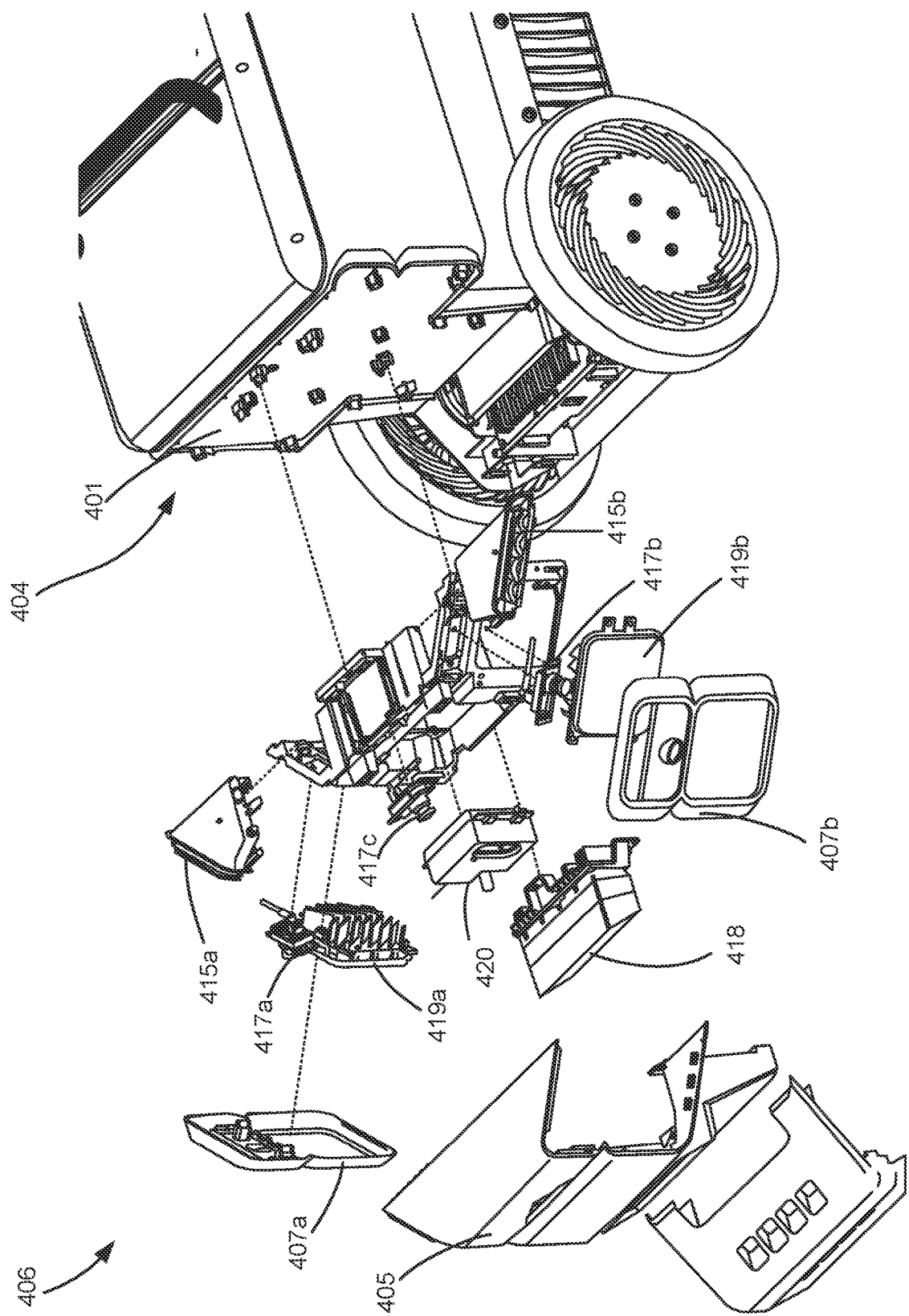
FIG. 4 illustrates an exploded view of an example of a front sensor system of a delivery vehicle according to an embodiment of the present disclosure.

FIG. 4 illustrates an exploded view of an example of a front sensor system 406 of a delivery vehicle according to an embodiment of the present disclosure. The front sensor system 306 can include a housing with a front wall 405 and angled walls 407a-b. The front wall 405 is parallel to a front side 401 of a cargo bay 404 of the delivery vehicle. The angled walls 407a-b can each intersect the front wall 405 and the front side 401. The first angled wall 407a includes a first light source 415a, a first camera 417a, and a first radar 419a installed in corresponding openings in the first angled wall 407a of the housing. The first radar 419a may be unobstructedly installed in the opening of the housing, meaning that the first radar 419a can be free of any cover, including a cosmetic cover that may be radio-frequency transparent in the range of radio frequencies that the first radar 419a uses. The first radar 419a can be mounted below the first camera 417a, and the first light source 415a can be mounted above the first camera 417a.

In an example, the second angled wall 407b includes a second light source 415b, a second camera 417b, and a second radar 419b installed in corresponding openings in the second angled wall 407b. The second radar 419b can be mounted below the second camera 417b, and the second light source 415b can be mounted above the second camera 417b. The second radar 419b can also be unobstructedly installed in the opening of the housing. The housing can have a third camera 417c and LiDAR 418 installed in corresponding openings in the front wall 405 of the housing, and the LiDAR 418 can be mounted below the third camera 417c. In addition, the housing includes a sound module 420 mounted between the third camera 417c and the LiDAR 418.

Each of the cameras 417a-c may be a monocular camera, and camera lenses of each of the cameras 417a-c can be oriented downwardly. In addition, the cameras 417a-c and additional cameras of a back sensor system (e.g., back sensor system 108 in FIG. 1) can form overlapping pairs of adjacent cameras and the cameras in each pair can have overlapping fields of view. The cameras 417a-c and the additional cameras have a collective 360° field of view along a horizontal plane. The radars 419a-b and at least one additional radar of the back sensor system also have a collective 360° field of view along the horizontal plane.

Figure 5:
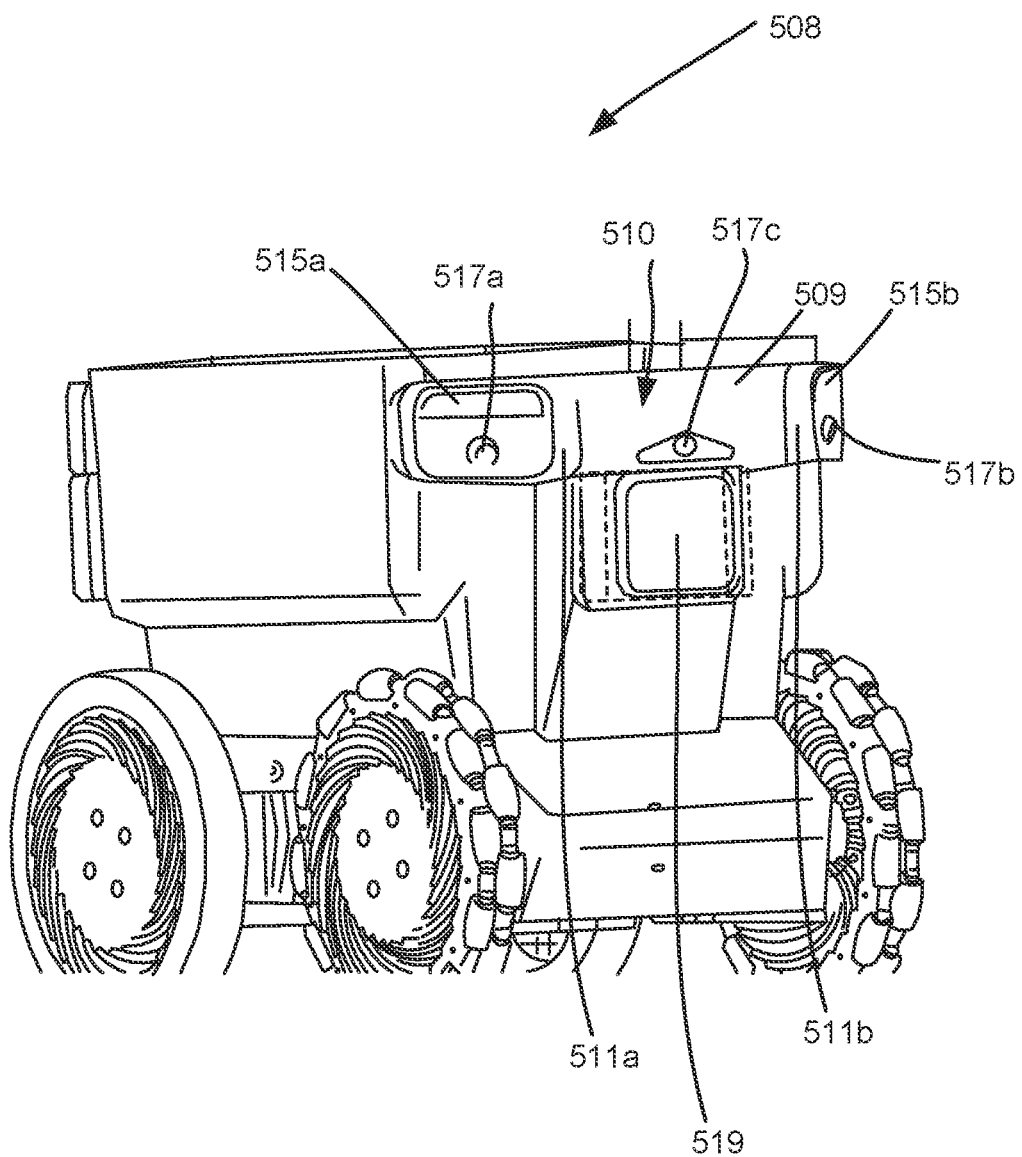
FIG. 5 illustrates an example of a back sensor system of a delivery vehicle according to an embodiment of the present disclosure.

FIG. 5 illustrates an example of a back sensor system 508 of a delivery vehicle according to an embodiment of the present disclosure. The back sensor system 508 is mounted to a back side of a cargo bay (e.g., back side 203 of cargo bay 204 in FIG. 2). The back sensor system 508 can include a housing 510. The housing 510 includes a back wall 509 and angled walls 511a-b. The back wall 509 is parallel to the back side and each of the angled walls 511a-b intersect the back wall 509 and the back side. The first angled wall 511a includes a first light source 515a, and a first camera 517a installed in corresponding openings in the first angled wall 507a of the housing 510. The first light source 515a can be mounted above the first camera 517a.

In an example, the housing 510 the second angled wall 511b includes a second light source 515b and a second camera 517b installed in corresponding openings in the second angled wall 511b. The second light source 515b can be mounted above the second camera 517b. The housing 510 can have a third camera 517c and a radar 519 installed in corresponding openings in the back wall 509 of the housing 510. The radar 519 can be mounted below the third camera 517c. The radar 519 may be unobstructedly installed in the opening of the housing 510, meaning that the radar 519 can be free of any cover, including a cosmetic cover that may be radio-frequency transparent in the range of radio frequencies that the radar 519 uses.

The light sources 515a-b, the cameras 517a-b, and the radar 519 may be positioned differently within the housing 510 in other examples. In addition, the back sensor system 508 may include a sound module mounted in the housing 510.

Each of the cameras 517a-b may be a monocular camera, and camera lenses of each of the cameras 517a-b can be oriented downwardly. In addition, the cameras 517a-b and additional cameras of a front sensor system (e.g., front sensor system 306 in FIG. 3) can form overlapping pairs of adjacent cameras and the cameras in each pair can have overlapping fields of view. The cameras 517a-b and the additional cameras have a collective 360° field of view along a horizontal plane. The radar 519 and additional radars of the front sensor system also have a collective 360° field of view along the horizontal plane.

Figure 6:
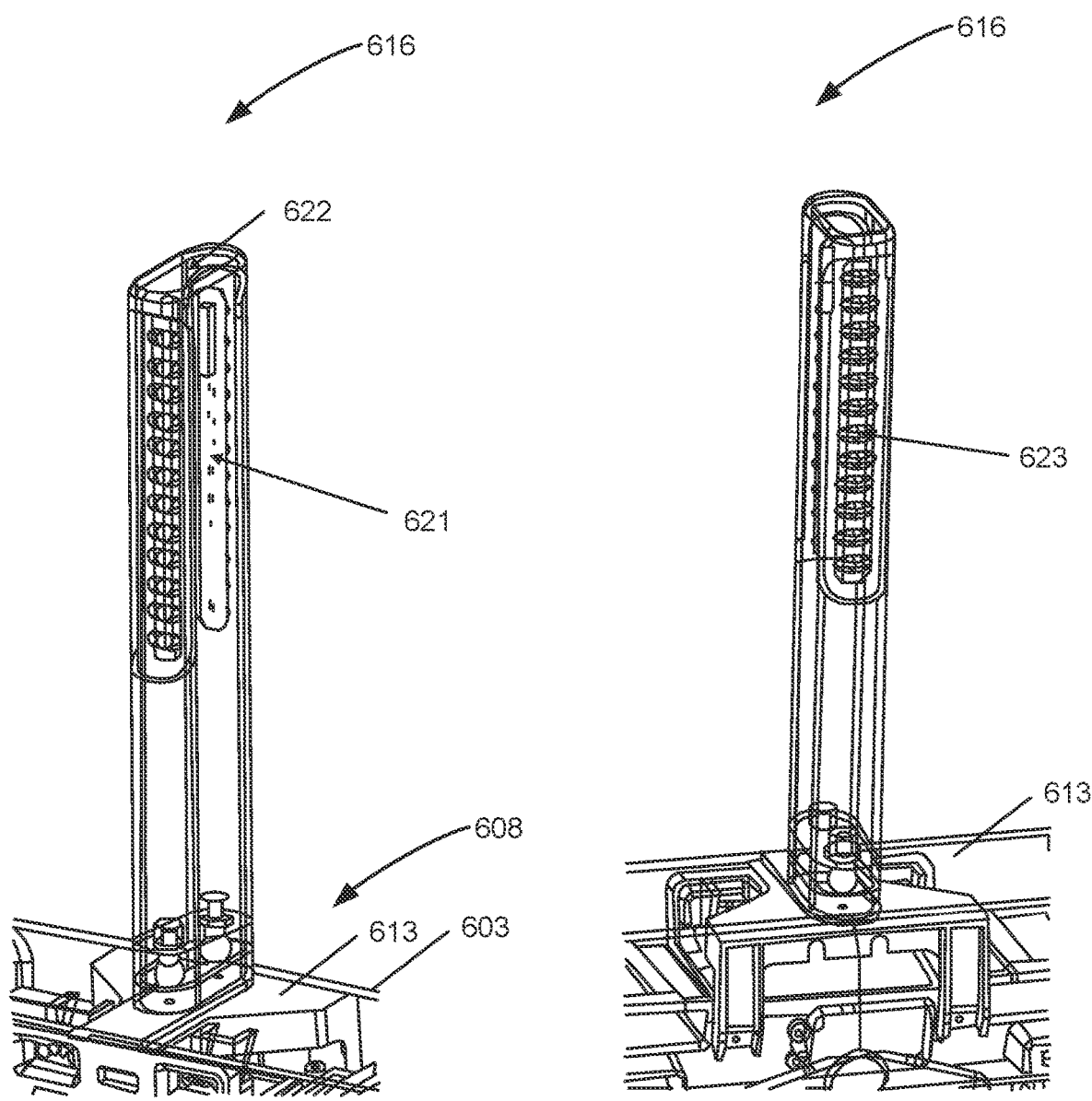
FIG. 6 illustrates an example of a mast of a delivery vehicle according to an embodiment of the present disclosure.

FIG. 6 illustrates an example of a mast 616 of a delivery vehicle according to an embodiment of the present disclosure. The mast 616 can be mounted to a back side 603 of a cargo bay (e.g., cargo bay 204 in FIG. 2) and through at least a top surface 613 of a housing of a back sensor system 608. The mast 616 can include a first light source 621 that faces the back side 603, a second light source 623 that faces an opposite direction of the first light source 621. The mast 616 can have a unique set of daytime and nighttime lighting modes for the first light source 621 and the second light source 623. The mast 616 also includes an ambient light sensor 622.

The mast 616 can enable nighttime and low-light driving of the delivery vehicle and can enable conspicuity so that the delivery vehicle is assuredly visible in a variety of lighting conditions. The mast 616 communicates visually to anyone observing the delivery vehicle. Brightness, color, and pattern of lighting used by the mast 616 can communicate various levels of urgency to observers. The lighting electronics support the ability to update modes based on usability and customer feedback.

Functions of the mast 616 can involve to-be-seen lighting and ambient light sensing. The mast 616 can include an array of LEDs mounted on a printed circuit board assembly. The mast module can have two printed circuit board assemblies covering the front and the rear of the delivery vehicle. The horizontal plane may have a designed field of view that is greater than 180°, therefore having the full 360° coverage of the delivery vehicle. The ambient light sensor 622 can be mounted at the top surface of the mast 616 to detect whether the light sources of the delivery vehicle are necessary given certain lighting conditions (e.g., driving at night). The ambient light sensor 622 can be placed in the highest spot to minimize the light pollution from the light sources as well as the mast 616 itself. The first light source 621 and the second light source 623 can have LEDs that emanate the light through two sets of lenses. The primary lens can be mounted directly on the printed circuit board assembly to better spread the light as designed. This primary lens may be used to achieve a desired field of view and brightness (e.g., two Lux at full brightness and one Lux at reduced at five meters). The secondary lens can provide environmental protection and enclosure of the printed circuit board assemblies. The mast 616 can be installed in the field. For instance, the mount may be snapped on using two ball joints by hand after which the operator can tighten screws to further secure the mast 616. This mounting junction can break off without breaking the individual piece parts. The electrical connection can also be designed to be easily separable (e.g., flex circuit) or to have some service loop in case the mast 616 does break off.

Although not shown in FIG. 6, the top surface 613, or other surfaces of the delivery vehicle, may include physical buttons for user interaction. For example, the physical buttons may be a power button, a battery button, and an emergency stop button.

In an example, the power button can be located on the top surface 613 the mast 616 and a lid assembly. This location may provide the easiest access for both development and dispenser. The power button may be exposed or hidden from view. This can be integrated into the battery carrier and contained with the battery when it is removed. Removal of a rear lower cover may be required to access this switch.

Figure 7:
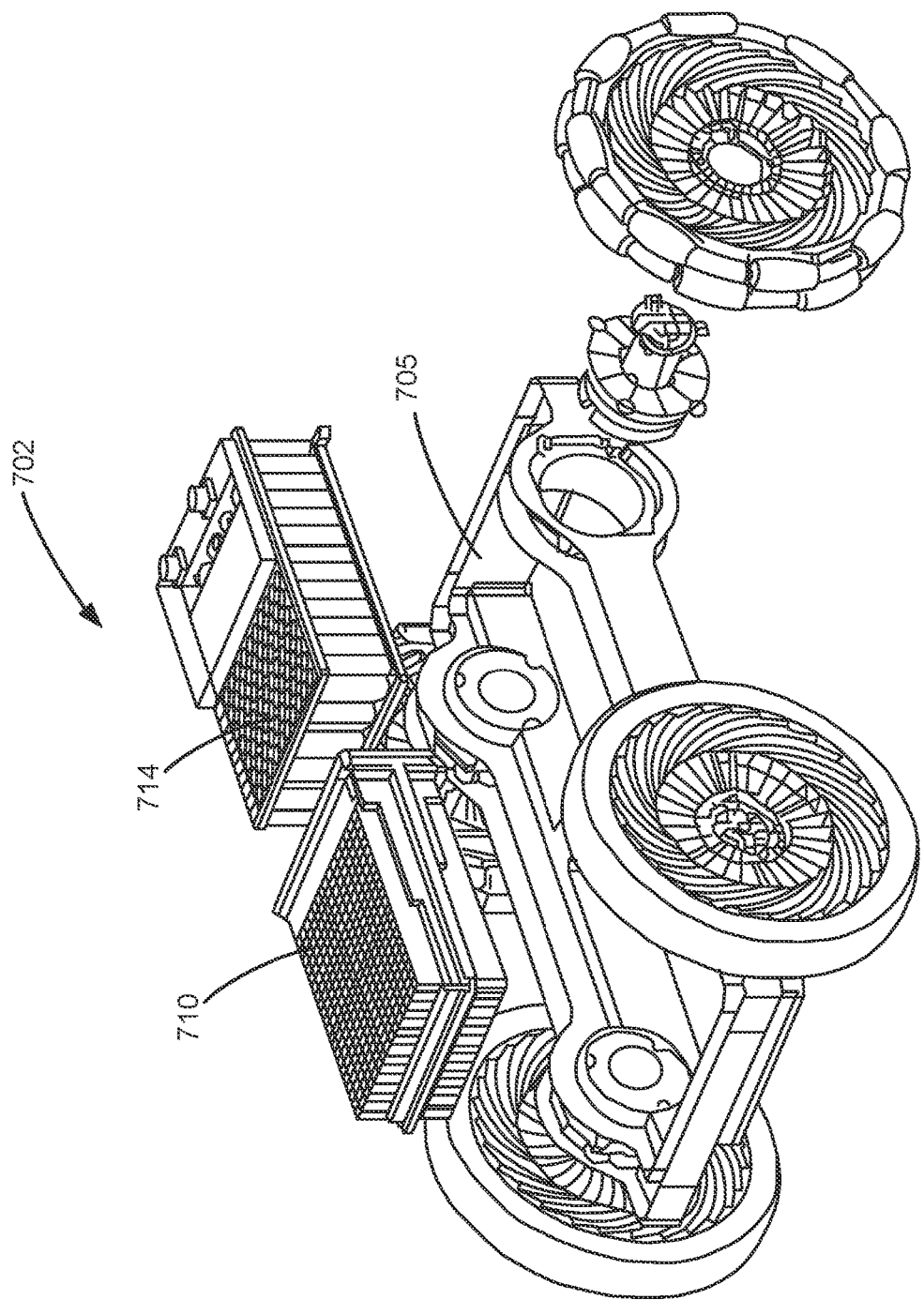
FIG. 7 illustrates an exploded view of an example of a chassis of a delivery vehicle according to an embodiment of the present disclosure.

FIG. 7 illustrates an exploded view of an example of a chassis 702 of a delivery vehicle according to an embodiment of the present disclosure. The chassis 702 includes a field replaceable unit 710 and a power storage unit 714. Although not shown in FIG. 7, the chassis 702 can also include a connector unit (e.g., connector unit 212 in FIG. 2) that connects the field replaceable unit 710 to the power storage unit 714.

The field replaceable unit 710 is the centralized compute and power management assembly and contains the autonomy compute printed circuit board and the power conversion and drivetrain control printed circuit board. The field replaceable unit 710 can be swapped in minutes with minimal tools. In addition, the field replaceable unit 710 connects to the connector unit for easy removal without a need to disconnect cables. A face seal between the two assemblies provides IP55 ingress protection when fully mated and installed in the delivery vehicle.

In an example, the chassis 702 can include a frame 705 into which the field replaceable unit 710, the connector unit, and the power storage unit 714 can be mounted. The frame 705 can include electrical wire routing attachments for securing electrical cables between the field replaceable unit 710, the connector unit, the power storage unit 714, and a sensor system of the delivery vehicle. One example of the electrical wire routing attachments are hooks, but other possible attachments may be used, such as recesses, channels, wire routing openings, etc.

Figure 8:
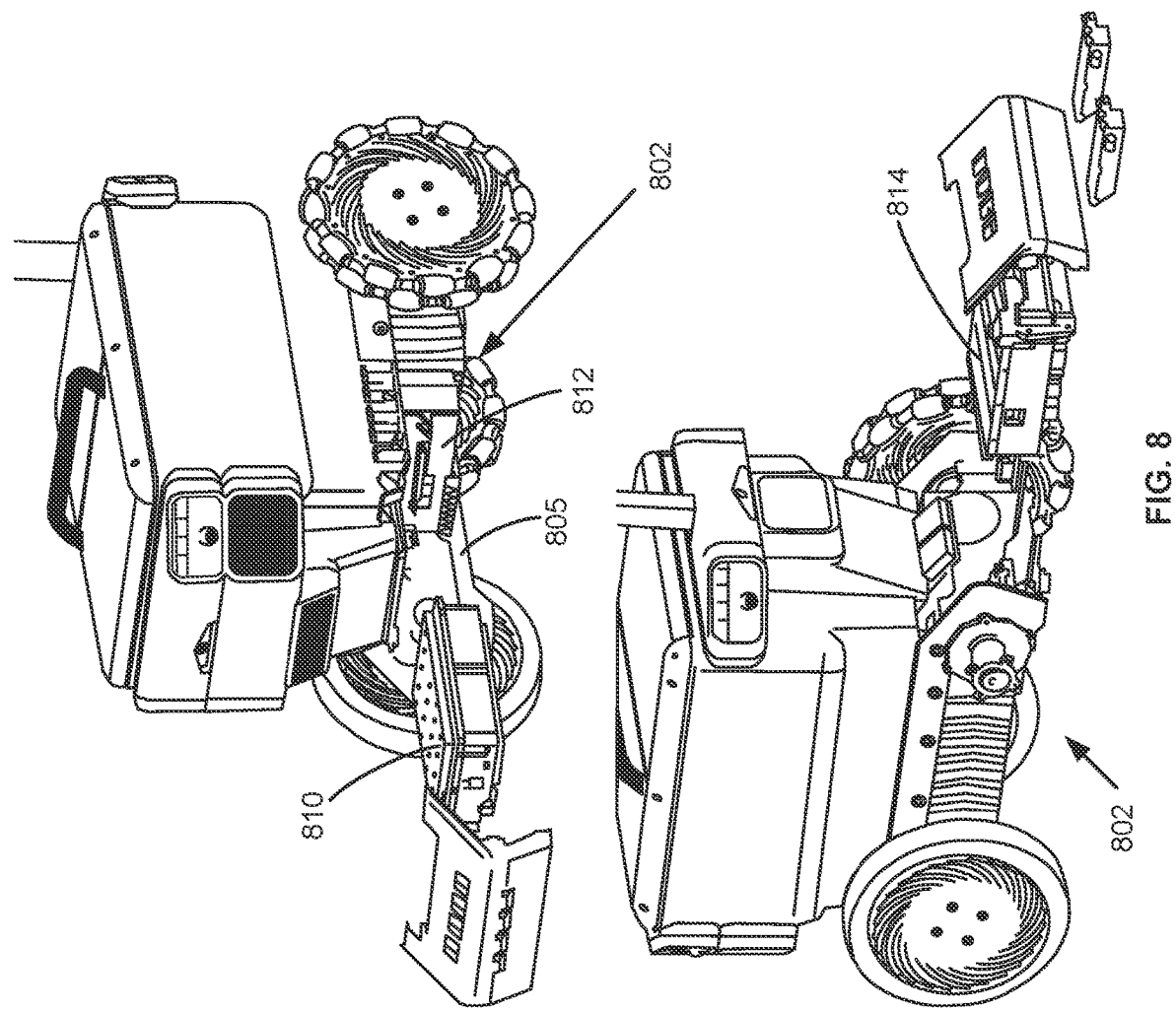
FIG. 8 illustrates partial exploded views of an example of a chassis of a delivery vehicle according to an embodiment of the present disclosure.

FIG. 8 illustrates partial exploded views of an example of a chassis 802 of a delivery vehicle according to an embodiment of the present disclosure. The chassis 802 includes a field replaceable unit 810, a connector unit 812, and a power storage unit 814. The field replaceable unit 810, the connector unit 812, and the power storage unit 814 are mounted to a frame 805 of the chassis 802. The frame 805 can include electrical wire routing attachments for routing cables on cable supports in the chassis 802 to direct the cables as they exit a printed circuit board of the connector unit 812. From the supports, the cables route to sensor system components to which they connect. All routing features can be molded into the supports and the sensor frames to decrease ambiguity with cable routing, ensure that routing is the same from delivery vehicle-to-delivery vehicle, and to eliminate the need for secondary operations by the manufacturing team.

Power is routed from the power storage unit 814 through the connector unit 812 to the field replaceable unit 810, where it is converted on a printed circuit board to provide system voltages and is switched/monitored before being distributed out via the connector unit 812 again to the various system loads outside the field replaceable unit 810. Within the field replaceable unit 810, power distribution between printed circuit boards is accomplished using high current board-to-board terminals rather than the connector unit 812 to minimize voltage drop and prioritize backplane connector pins for the external interfaces of the field replaceable unit 810. A single battery pack may be the sole energy source for vehicle operations during a mission. As an example, the battery pack energy capacity can be 2.1 kWh.

Figure 9:
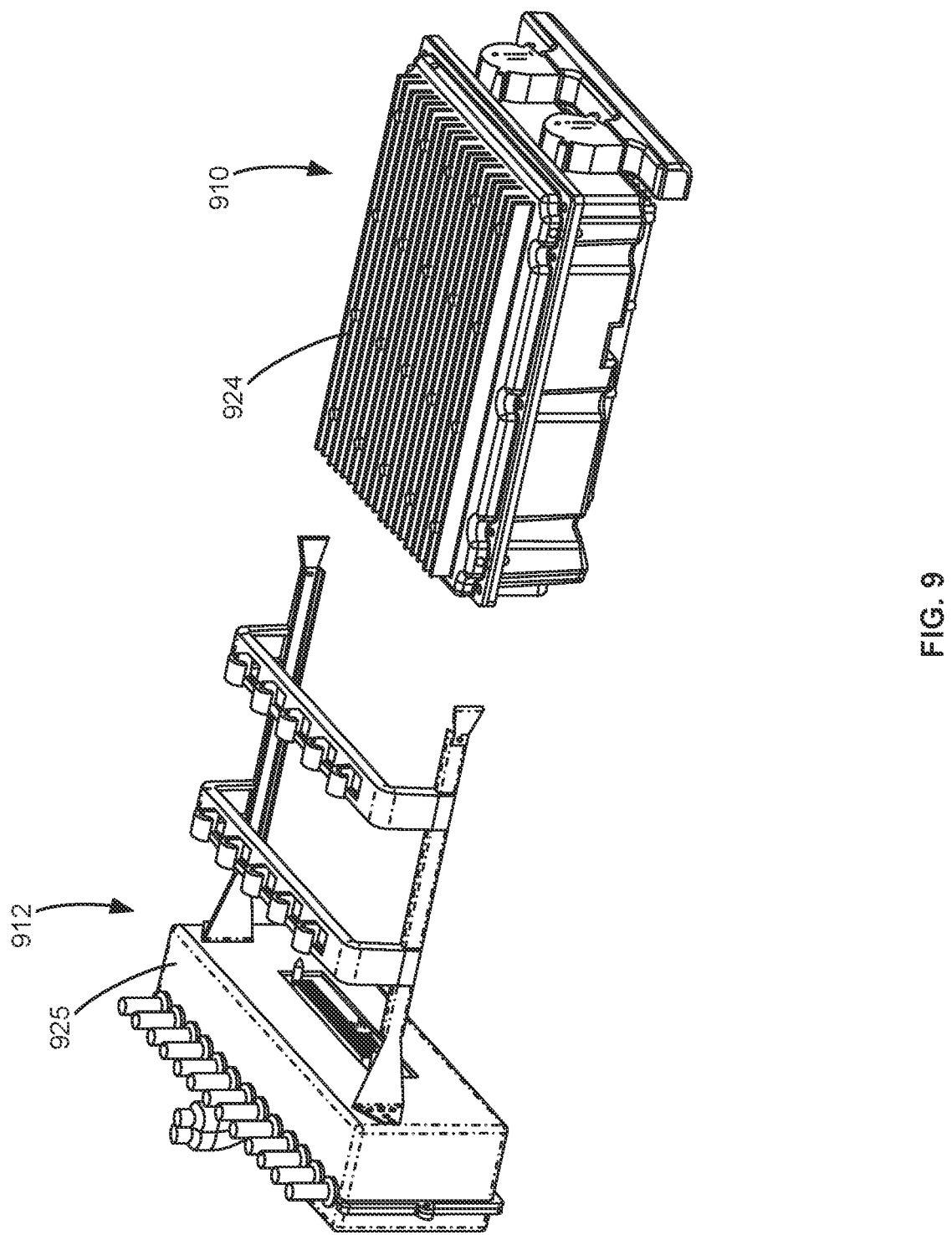
FIG. 9 illustrates an example of a field replaceable unit and a connector unit of a delivery vehicle according to an embodiment of the present disclosure.

FIG. 9 illustrates an example of a field replaceable unit 910 and a connector unit 912 of a delivery vehicle according to an embodiment of the present disclosure. The field replaceable unit 910 includes a waterproof-sealed enclosure 924. In addition, the connector unit 912 also includes a waterproof-sealed enclosure 925. Each of the field replaceable unit 910 and the connector unit 912 include sets of printed circuit boards and are electrically coupled via connectors and electrical cables, as described herein below in FIGS. 10 and 11.

Figure 10:
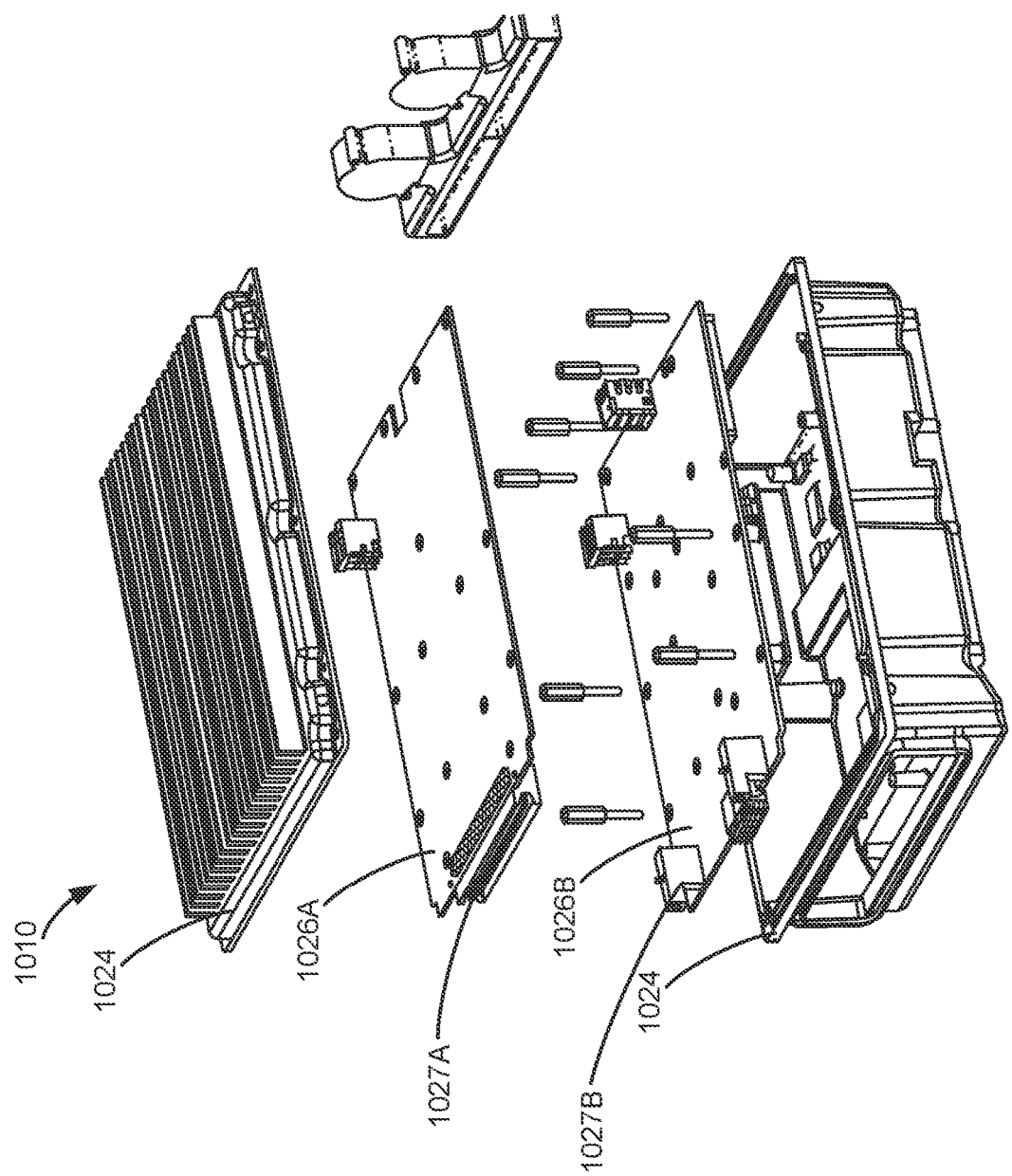
FIG. 10 illustrates an exploded view of an example of a field replaceable unit of a delivery vehicle according to an embodiment of the present disclosure.

FIG. 10 illustrates an exploded view of an example of a field replaceable unit 1010 of a delivery vehicle according to an embodiment of the present disclosure. The field replaceable unit 1012 includes a waterproof-sealed enclosure 1024 and a set of printed circuit boards 1026A-B. One of the printed circuit boards 1026A-B can be an autonomy compute board and the other of the printed circuit boards 1026A-B can be a power conversion and drivetrain control board. The power conversion and drivetrain control board can serve as a compute executing of central synchronization of motor controllers, power conversion, power sequencing/distribution, coordination of lighting control, and monitoring within the delivery vehicle. At least one of the printed circuit boards 1026A-B can process sensor data of a sensor system of the delivery vehicle. The field replaceable unit 1012 also includes a connector 1027 that is electrically coupled to the printed circuit boards 1026A-B. For example, connector 1027A can be electrically coupled to the printed circuit board 1026A and connector 1027B can be electrically coupled to the printed circuit board 1026B.

Figure 11:
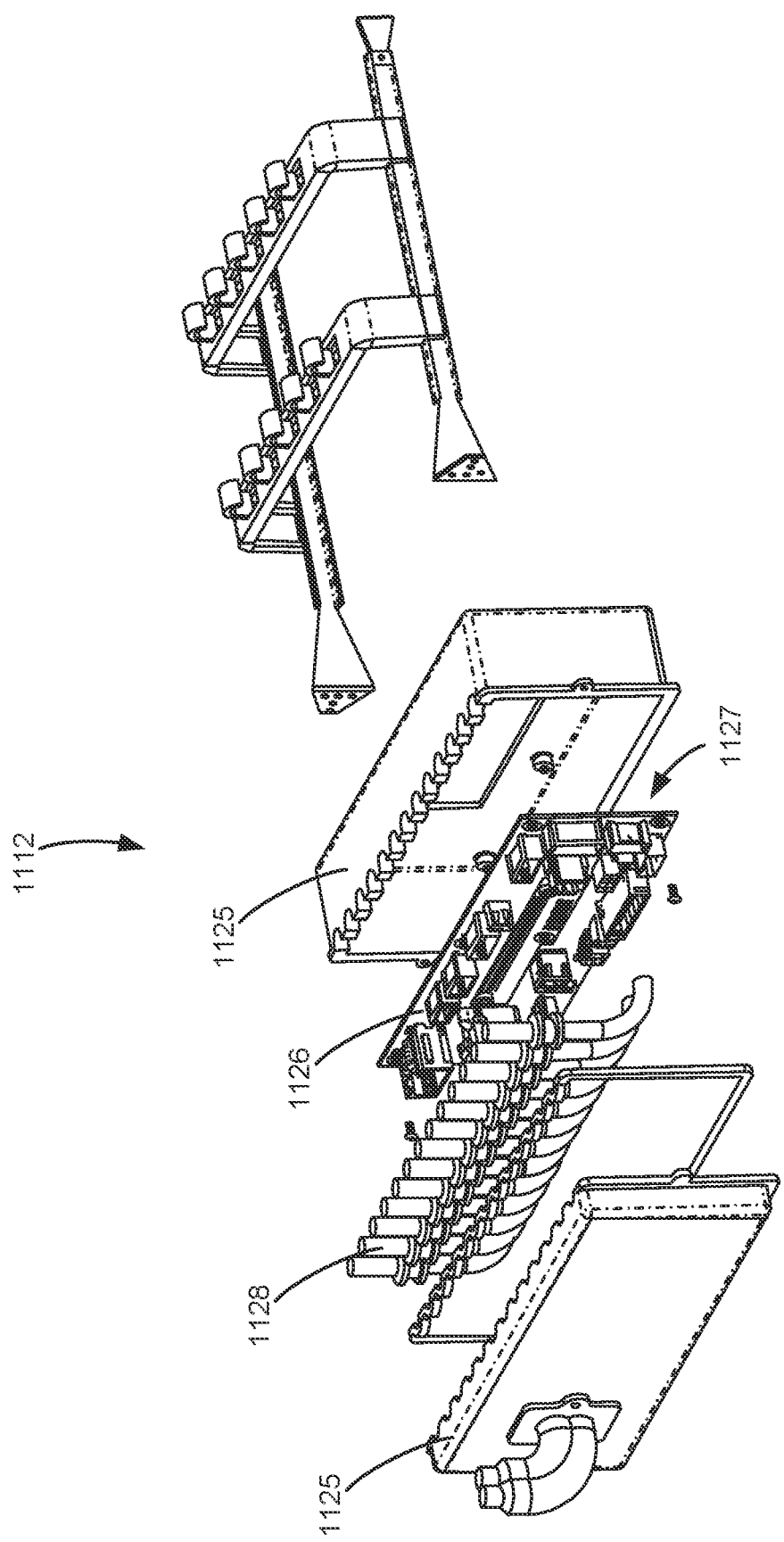
FIG. 11 illustrates an exploded view of an example of a connector unit of a delivery vehicle according to an embodiment of the present disclosure.

FIG. 11 illustrates an exploded view of an example of a connector unit 1112 of a delivery vehicle according to an embodiment of the present disclosure. The connector unit 1112 includes a waterproof-sealed enclosure 1125 and a set of printed circuit boards 1126. The printed circuit board 1126 can connect to all peripheral devices. The connector unit 1112 also includes a connector 1127 (not visible in FIG. 11) that mates with a connector of a field replaceable unit (e.g., connector 1027A-B of field replaceable unit 1010 in FIG. 1) and is electrically coupled to electrical cables via the printed circuit board 1126. The connector 1127 can mate with the connector of the field replaceable unit along a horizontal plane. The printed circuit board 1126 includes connectors 1128 that receive the electrical cables. Each of the connectors can be latching to minimize defects from vibration, and do not require a tool to connect or disconnect.

The connector 1127 between the connector unit 1112 and the field replaceable unit pass power and signal to the field replaceable unit and enables a cable-free removal of the field replaceable unit. The connector unit 1112 may not be a field replaceable unit. The connector unit 1112 may provide easy access for cable replacement while eliminating 90° bends as the cables exit the waterproof-sealed enclosure 1125. A removable top lid provides visibility and clear hand access to the cables, allowing most harness to be changed without disturbing other harnesses. The electrical cables can be harnessed together, meaning several component cables can connect to a single connector on the printed circuit board 1126. This allows the number of connectors used on the printed circuit board 1126 to be minimized, saving space and cost, while also decreasing the number of individual parts. Individual cables that are part of the same cable harness can exit out of the printed circuit board 1126 separately, or together, based on their routing in the delivery vehicle.

Figure 12:
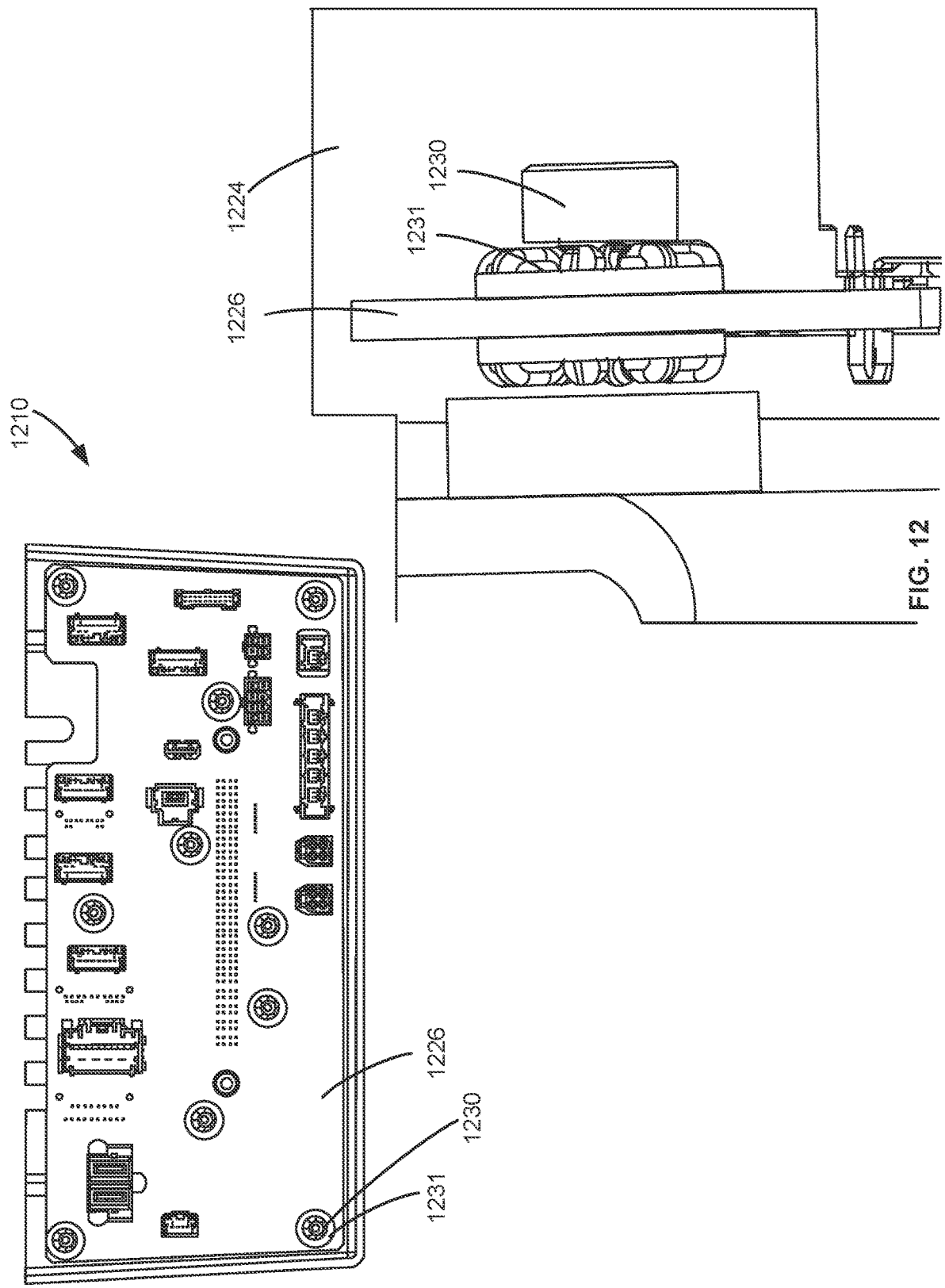
FIG. 12 illustrates an example of a field replaceable unit having grommets of a delivery vehicle according to an embodiment of the present disclosure.

FIG. 12 illustrates an example of a field replaceable unit 1210 having grommets 1231 of a delivery vehicle according to an embodiment of the present disclosure. A printed circuit board 1226 can be installed into a waterproof-sealed enclosure 1224 of the field replaceable unit 1210 along a vertical plane. The installation of the printed circuit board 1226 can include the grommet 1231 disposed in a hole of the printed circuit board 1226. A shank 1230 can be inserted in the grommet 1231 in a horizontal direction such that a translational movement of the printed circuit board 1226 within the waterproof-sealed enclosure 1224 is allowed in the vertical plane when a connector of the field replaceable unit 1210 mates with a connector of a connector unit. By allowing the translational movement, the mating of the field replaceable unit 1210 with connector unit (e.g., the connector unit 1112 of FIG. 11) can become easier, whereby connectors between them can properly mate.

Figure 13:
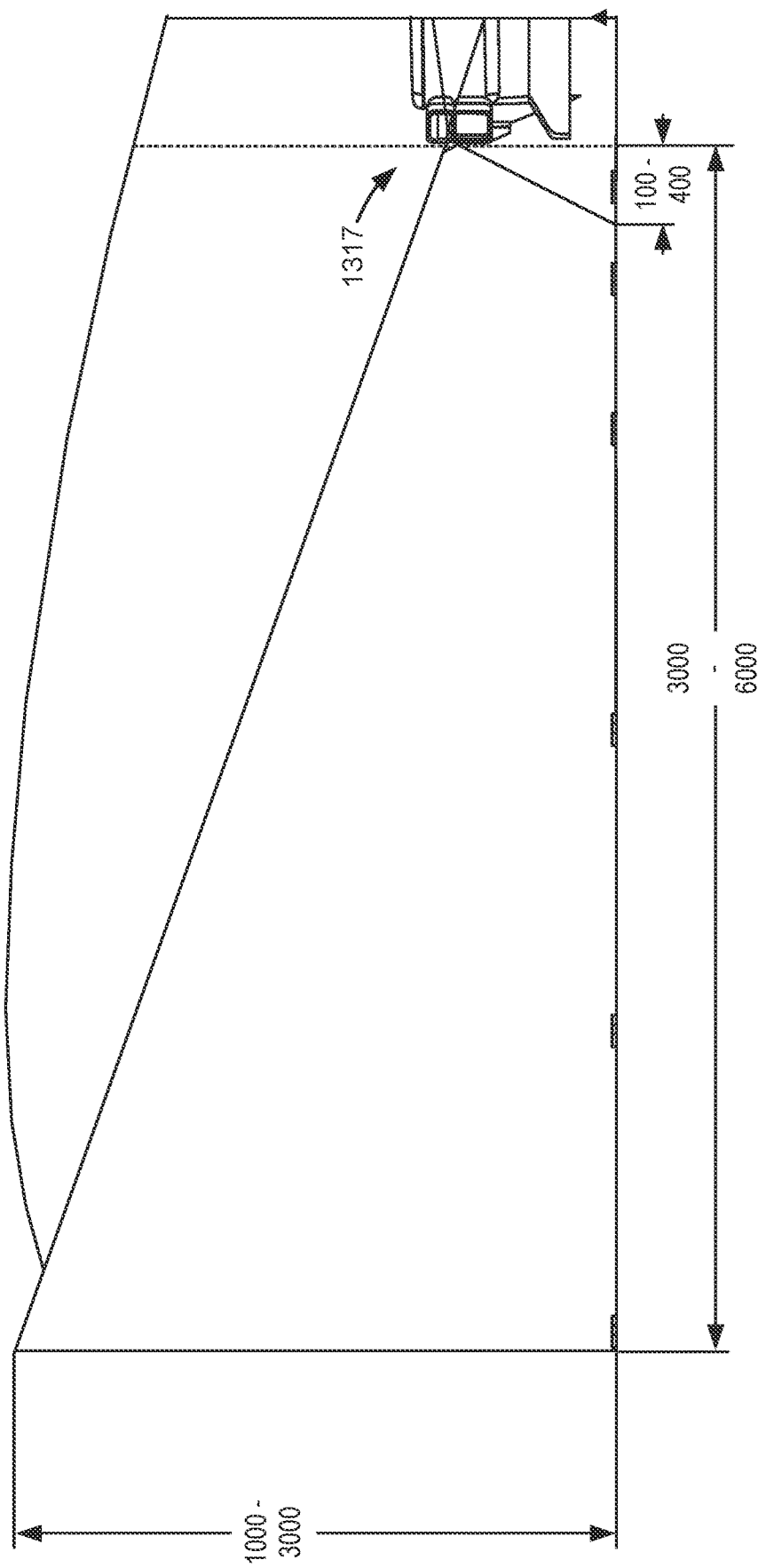
FIG. 13 illustrates a side view of a field of view of a camera of a delivery vehicle according to an embodiment of the present disclosure.
Figure 14:
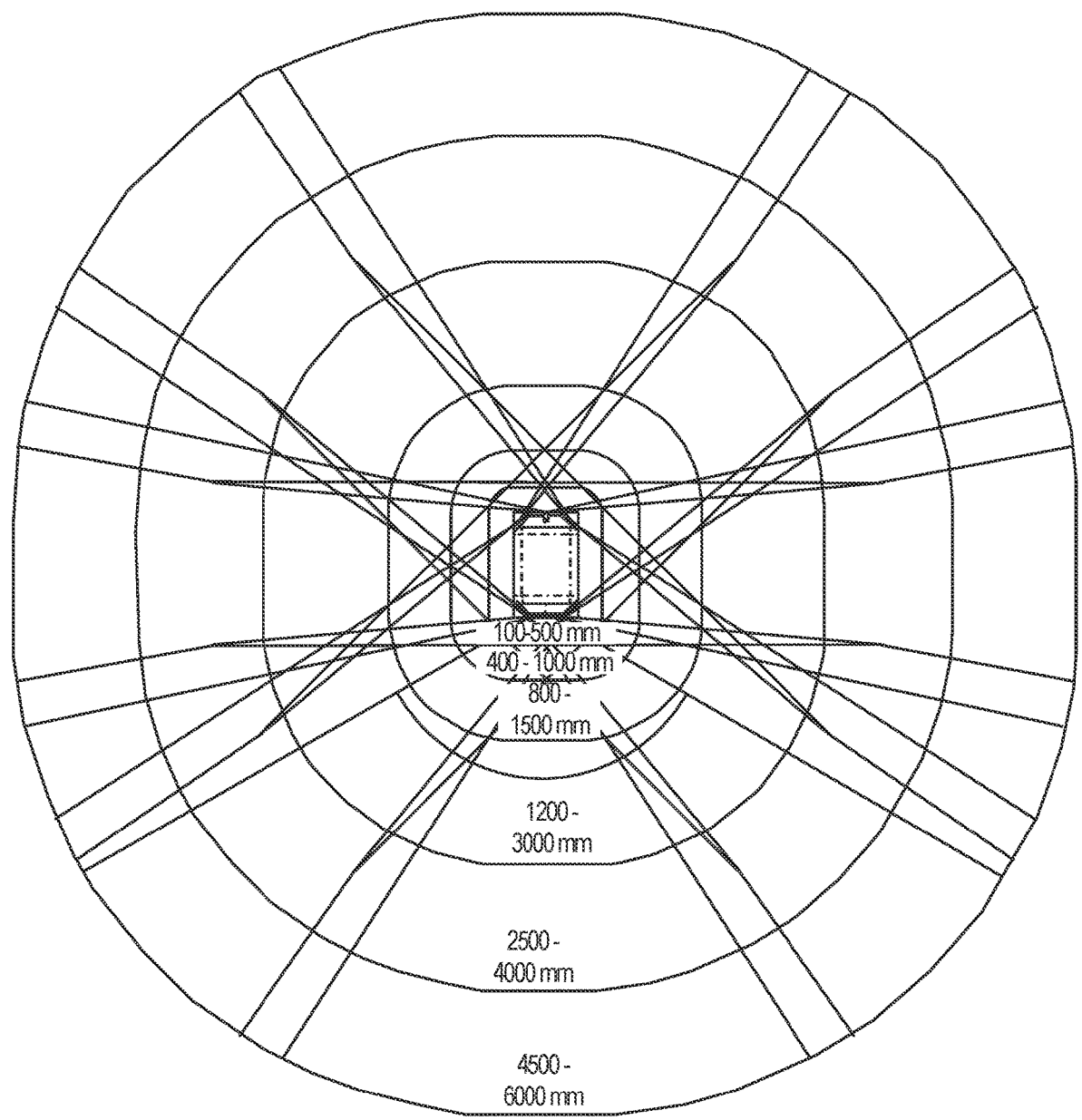
FIG. 14 illustrates a top view of a field of view of cameras of a delivery vehicle according to an embodiment of the present disclosure.

FIG. 13 illustrates a side view of a field of view of a camera 1317 of a delivery vehicle and FIG. 14 illustrates a top view of a field of view of cameras of a delivery vehicle according to an embodiment of the present disclosure. The camera 1317 is a center camera of the delivery vehicle. Horizontally in one example, the camera 1317 has a field of view between three thousand and six thousand millimeters, but the first one-hundred to four-hundred mm are not included. Other cameras positioned at corners of the delivery vehicle may have a similar horizontal field of view with less distance that is not included in the field of view. Vertically in one example, the camera 1317 has a field of view of between one thousand and three thousand mm.

In FIG. 14, the horizontal field of views of each camera are shown as overlapping. That is, the field of view of each pair of adjacent cameras overlap. As illustrated, the cameras have a collective 360° field of view between four-thousand five-hundred and six thousand mm. So, the cameras can detect objects in a 360° radius around the delivery vehicle as long as the objects are also within the vertical field of view.

Figure 15:
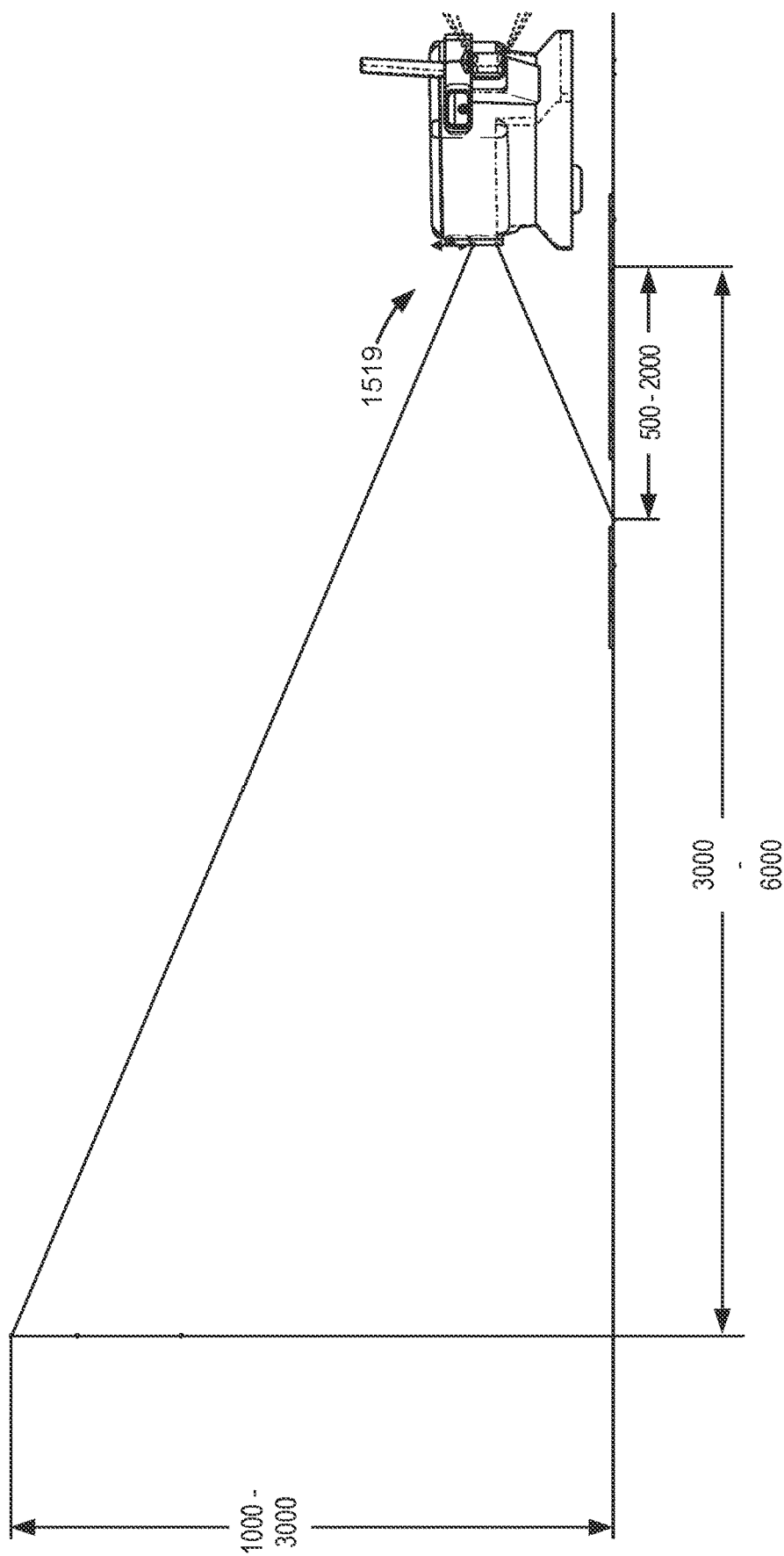
FIG. 15 illustrates a side view of a field of view of a radar of a delivery vehicle according to an embodiment of the present disclosure.
Figure 16:
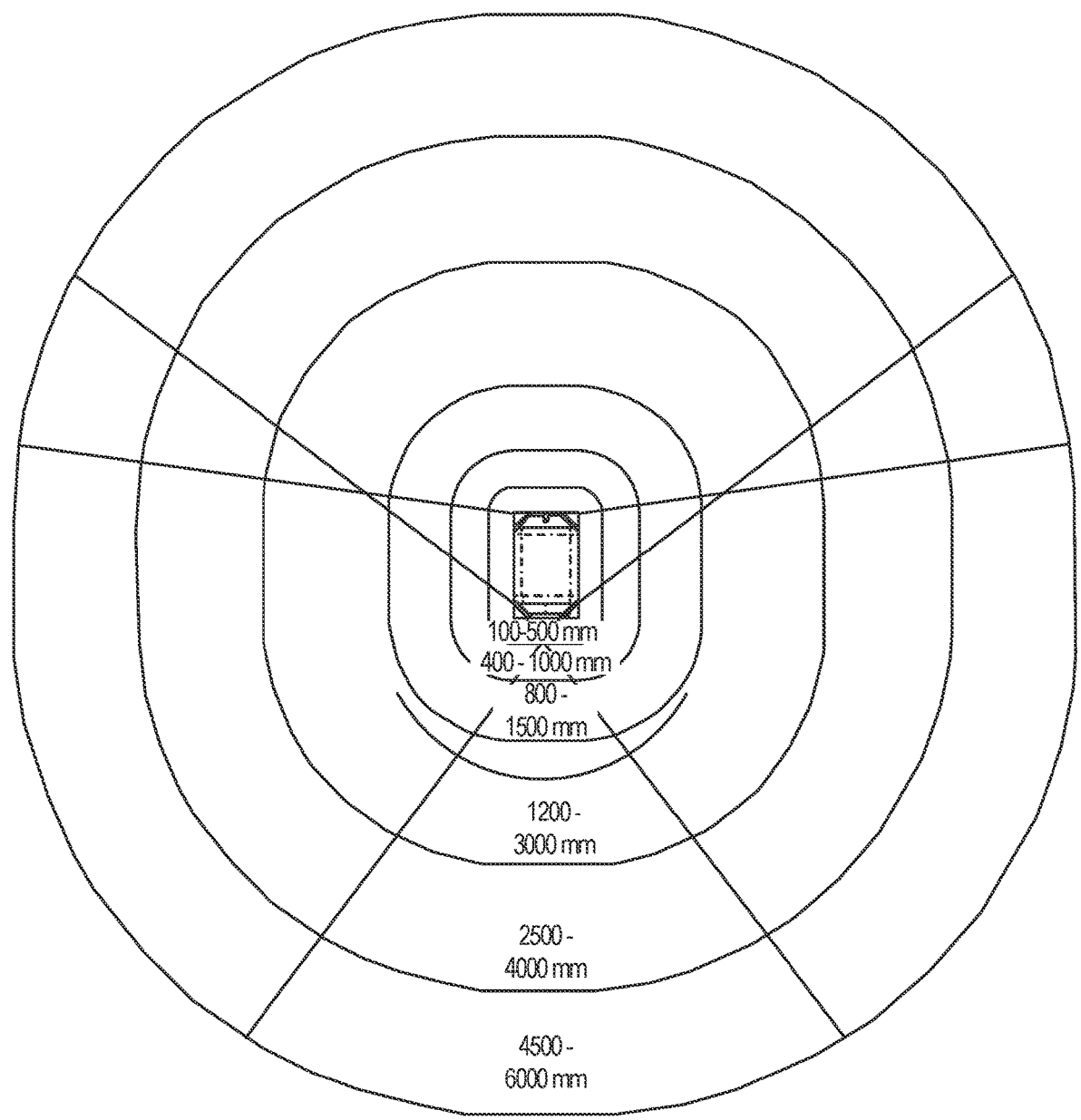
FIG. 16 illustrates a top view of a field of view of radars of a delivery vehicle according to an embodiment of the present disclosure.

FIG. 15 illustrates a side view of a field of view of a radar 1519 of a delivery vehicle and FIG. 16 illustrates a top view of a field of view of radars of a delivery vehicle according to an embodiment of the present disclosure. The radar 1519 may be a center radar of the delivery vehicle. Horizontally in one example, the radar 1519 can have a field of view between three thousand and six thousand millimeters, but the first one-hundred to four-hundred mm are not included. Other radars positioned at corners of the delivery vehicle may have a similar horizontal fields of view. The radar 1519 may have a vertical field of view between one thousand and three thousand mm.

In FIG. 16, the horizontal field of views of each radar are shown as overlapping. The horizontal field of views of the radars overlap, such that the radars have a collective 360° field of view between four-thousand five-hundred and six thousand mm. So, the radars can detect objects in a 360° radius around the delivery vehicle as long as the objects are also within the vertical field of view.

Figure 17:
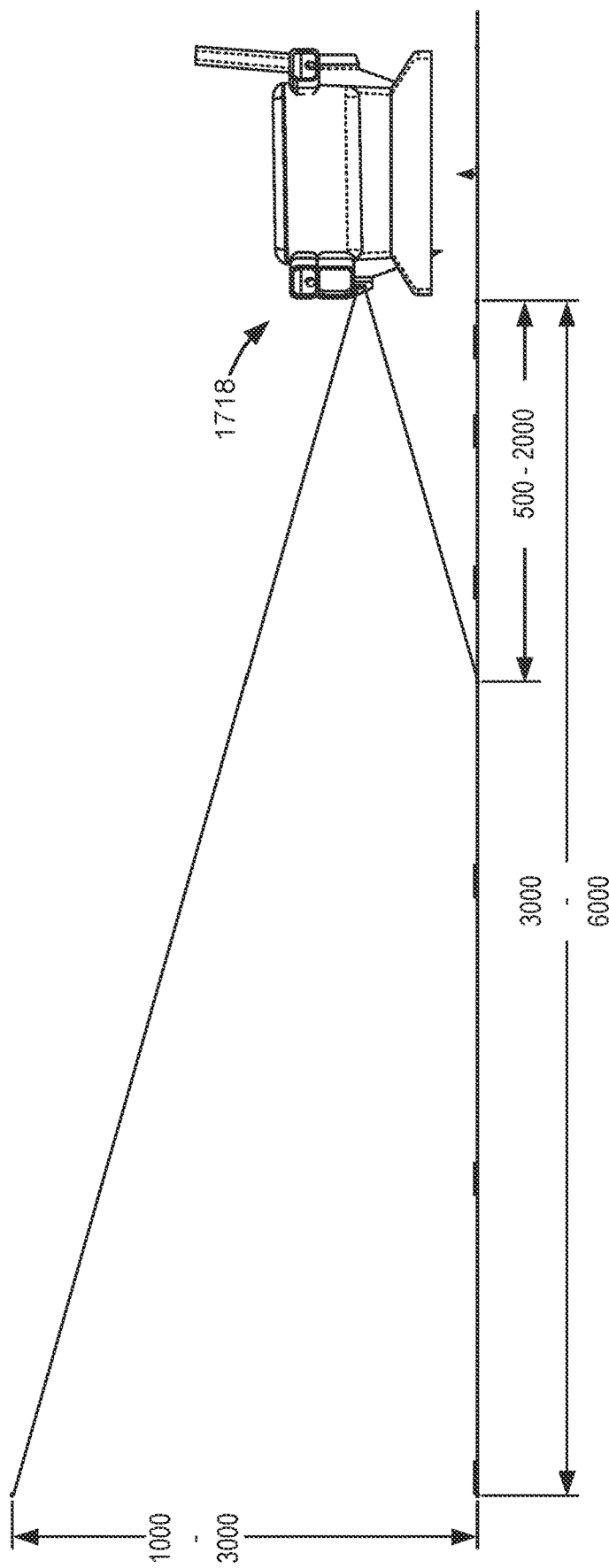
FIG. 17 illustrates a side view of a field of view of a light detection and ranging sensor of a delivery vehicle according to an embodiment of the present disclosure.
Figure 18:
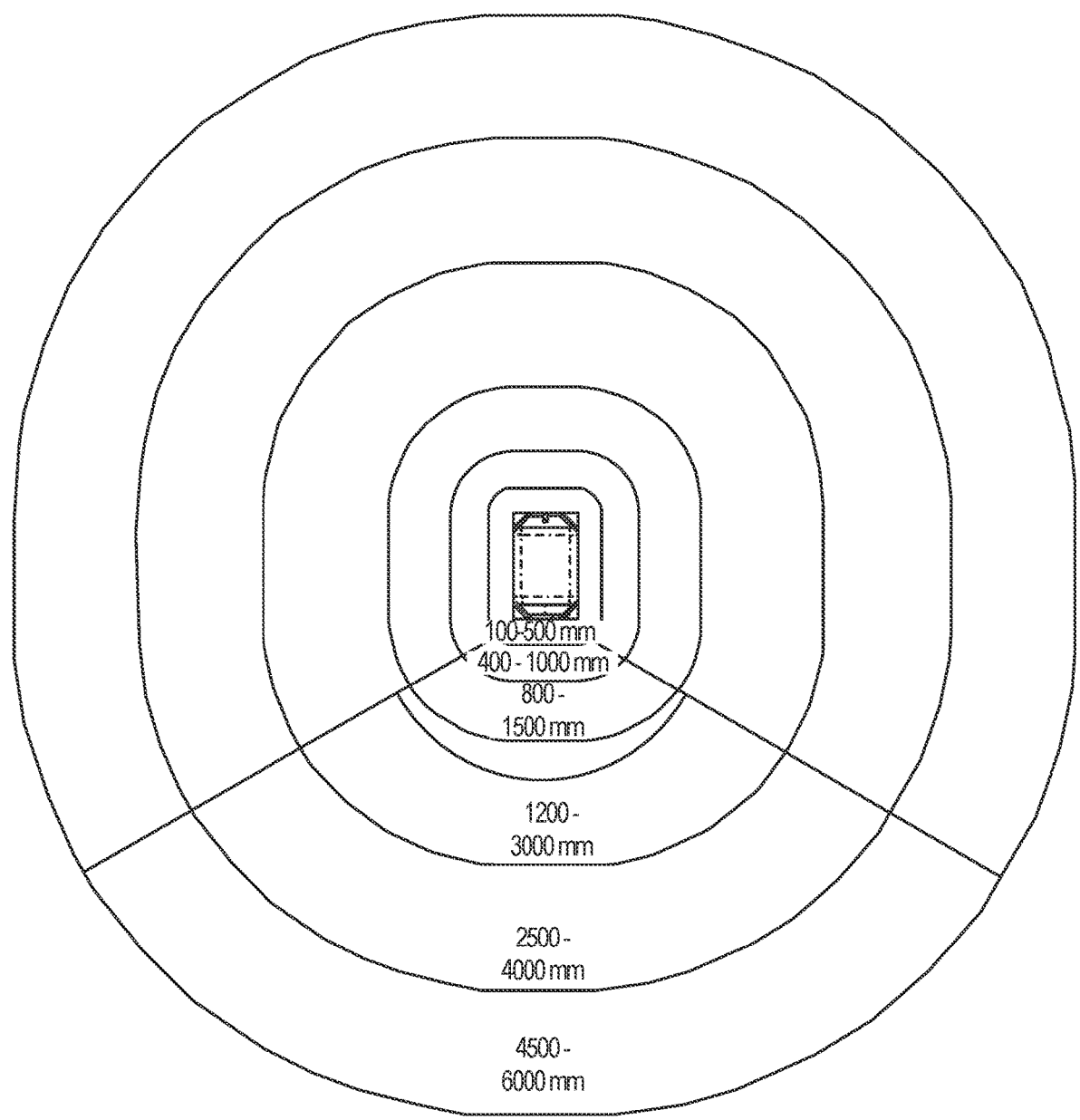
FIG. 18 illustrates a top view of a field of view of a light detection and ranging sensor of a delivery vehicle according to an embodiment of the present disclosure.

FIG. 17 illustrates a side view of a field of view of a light detection and ranging sensor of a delivery vehicle and FIG. 18 illustrates a top view of a field of view of a LiDAR 1718 of a delivery vehicle according to an embodiment of the present disclosure. The LiDAR 1718 is a center LiDAR of the delivery vehicle. Horizontally in one example, the LiDAR 1718 has a field of view between three thousand and six thousand millimeters, but the first five hundred to two thousand mm are not included. Vertically in one example, the LiDAR 1718 has a field of view between one thousand and three thousand mm. In FIG. 18, the horizontal field of views of the LiDAR is shown as covering about 120° around the delivery vehicle. So, the LiDAR can detect objects in a 120° radius around the delivery vehicle as long as the objects are also within the vertical field of view.

Figure 19:
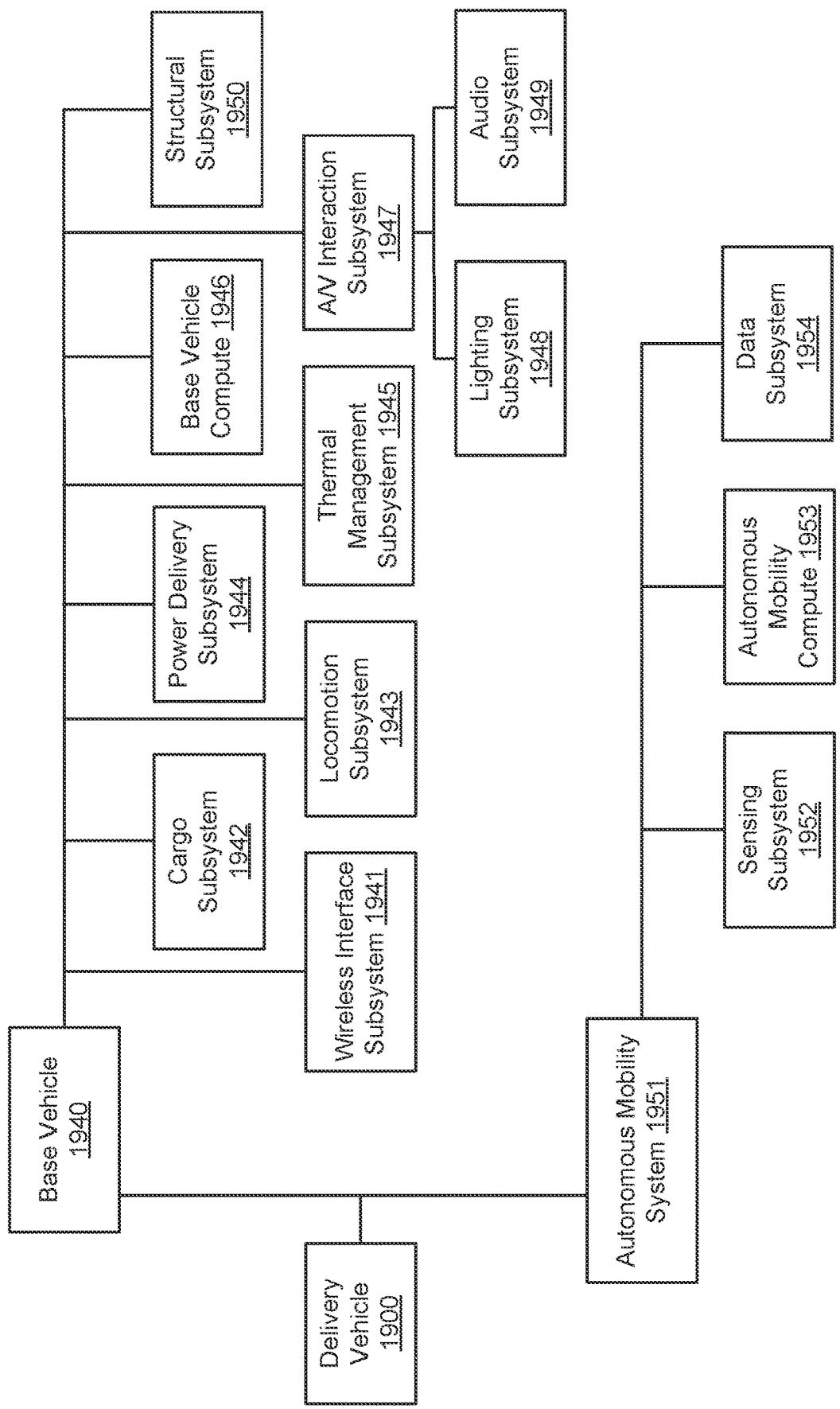
FIG. 19 illustrates an example of electrical subsystems of a delivery vehicle according to an embodiment of the present disclosure.

FIG. 19 illustrates an example of electrical subsystems of a delivery vehicle 1900 according to an embodiment of the present disclosure. The delivery vehicle 1900 includes two basic subsystem groups including a base vehicle 1940 and an autonomous mobility system 1951. The base vehicle 1940 includes subsystems for making the delivery vehicle 1900 mobile except for autonomy and high-level control elements. The autonomous mobility system 1951 includes elements for enabling high-level control for autonomy.

In an example, the autonomous mobility system 1951 includes a sensing subsystem 1952, an autonomous mobility compute 1953, and a data subsystem 1954. The sensing subsystem 1952 can generate the perception and localization data required for autonomy. The autonomous mobility compute 1953 can provide the required compute to run high level control and autonomy functions at specified levels of performance and reliability, such as autonomy and delivery vehicle state management. For autonomy, the autonomous mobility compute 1953 perceives the environment and localizes and navigates the delivery vehicle 1900, enforces safe motion regardless of a control mode (e.g., autonomous, teleoperation, etc.). For delivery vehicle state management, the autonomous mobility compute 1953 manages the state of the delivery vehicle 1900, monitors system health, and enacts contingencies in response to faults. The data subsystem 1954 manages the flow and storage of data in the autonomous mobility system 1951.

In an example, the base vehicle 1940 includes a wireless interface subsystem 1941, a cargo subsystem 1942, a locomotion subsystem 1943, a power delivery subsystem 1944, a thermal management subsystem 1945, a base vehicle compute 1946, an audio/visual (A/V) interaction subsystem 1947 (including a lighting subsystem 1948 and an audio subsystem 1949), and a structural subsystem 1950. The wireless interface subsystem 1941 provides wireless interfaces for server applications (e.g., expedition management, tele-driving, remote monitoring, health telemetry, etc.) and local joystick operation. The cargo subsystem 1942 holds and organizes the cargo, protects the cargo from damage or theft, and gives secure access to the cargo. The locomotion subsystem 1943 generates motion output from commanded inputs and controls brake control, monitors actuation safety, and provides motion feedback. The locomotion subsystem 1943 can generate the actuation forces for moving and parking the delivery vehicle 1900 given motion and state commands. It is also responsible for executing emergency stops upon request or due to internal faults. It can be built on a four-wheeled architecture with large diameter wheels, two traction wheels in front and two omni-wheels in the rear. All four wheels may have compliant hub structures to reduce shock and vibration to the system. Inputs to the locomotion subsystem 1943 can include a target locomotion state, a target linear velocity, a target rotational velocity, and an actuator power. Outputs of the locomotion subsystem 1943 can include ground forces and locomotion telemetry.

The power delivery subsystem 1944 sources and sinks energy from the system and provides distribution and control of power to components. The delivery vehicle 1900 is powered by a battery which sources regulated direct current (DC) power to components and sources and sinks unregulated power to and from the motors. Battery voltage is converted to multiple DC rails with different voltages and power ratings to supply various components and subsystems of the delivery vehicle 1900. The power delivery subsystem 1944 is responsible for providing control of power hardware for startup and shutdown sequencing, a means to turn the system on and off, hardware control to enable low-power states, and monitoring and response of power distribution failures. The power delivery subsystem 1944 can store energy, convert battery voltage, control power rails, turn the delivery vehicle 1900 on and off, isolate battery power, and monitor the power delivery subsystem 1944. Inputs to the power delivery subsystem 1944 can include a power button, a battery isolation interface, a delivery vehicle state information, and charge power. The power delivery subsystem 1944 can output regulated power rails of DC/DC converted battery power to subsystems and components, actuator power to the locomotion subsystem 1943, and power delivery telemetry.

The thermal management subsystem 1945 provides active and passive cooling of heat generating components that need cooling to remain with their operating temperature range. The thermal management subsystem 1945 manages heat generated by sources including, for instance, electronics, solar radiation, and ground radiation. Radiation loads are reduced by selection of colors and materials which help reflect radiation instead of absorbing it and generating heat. Two fan arrays provide active cooling for a field replaceable unit and battery. The field replaceable unit can be the most power dense subsystem in the delivery vehicle 1900 and the battery is the lowest rated component. The field replaceable unit enclosure doubles as a heatsink, transferring heat from components inside the field replaceable unit to the cool air flowing around it. Heatsinks and fans are sized to handle maximum steady-state thermal loads for each component inside. Passive cooling, by means of heatsinks and natural convection, cools all other heat generating components. This includes cameras, LiDAR, radars, light modules, and other printed circuit boards in the system.

The base vehicle compute 1946 provides the required compute to run low level vehicle hardware control functions at specified levels of performance and reliability. The A/V interaction subsystem 1947 provides visual and audial cues to humans in the vicinity for safety and to facilitate interaction via the lighting subsystem 1948 and the audio subsystem 1949. The delivery vehicle 1900 incorporates the use of audio for messaging via speaker and horn to improve safety and customer experience. Customers, pedestrians, and vehicle drivers can understand various levels of urgency based on the volume and pattern of sounds used. The audio speaker electronics shall support playback of pre-recorded sounds triggered over a controlled area network (CAN) bus interface. This module can support the ability to update audio. Real-time audio streaming or microphone input is out of scope. The audio subsystem 1949 can store audio files, update audio files, play audio files, sound a horn, manage power, and monitor health. Inputs to the audio subsystem 1949 can include audio commands, audio files, horn commands, and power state. Outputs of the audio subsystem 1949 can include audio output, horn output, and audio subsystem state.

The structural subsystem 1950 provides structure and structural integrity for the delivery vehicle 1900 and provides positioning and mounting for components. The base vehicle 1940 may also include a home vehicle interface for providing a means to connect to infrastructure to charge the delivery vehicle 1900, offload collected data, and protect the delivery vehicle 1900 in the field when not in operation.

Figure 20:
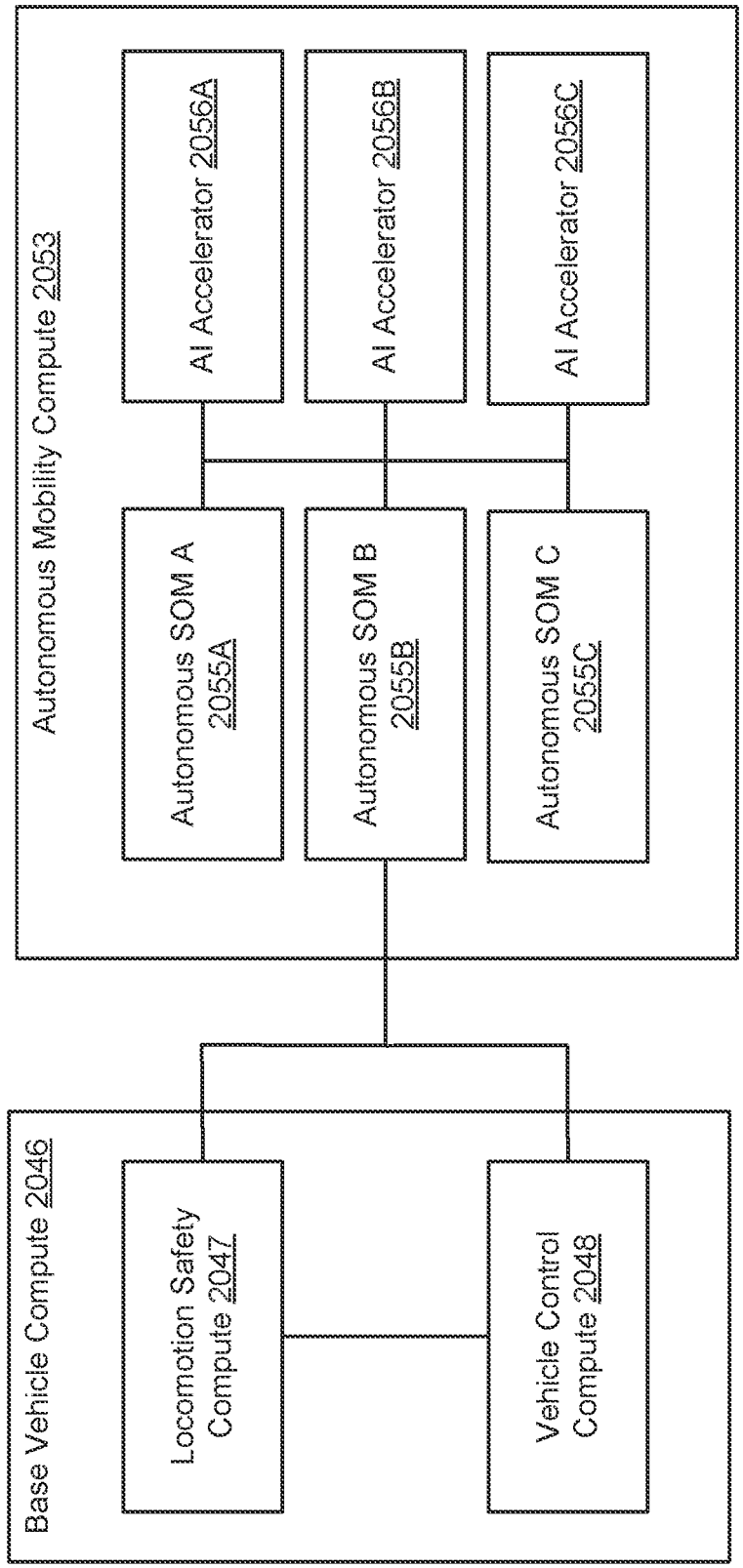
FIG. 20 illustrates an example of a compute subsystem of a delivery vehicle according to an embodiment of the present disclosure.

FIG. 20 illustrates an example of a compute subsystem of a delivery vehicle according to an embodiment of the present disclosure. The compute subsystem is a set of shared compute resources for high-level control of the delivery vehicle and its hardware. It does not include all processors on the delivery vehicle as some subsystems have dedicated processing as part of their subsystem and do not share their resources with other subsystems (e.g., a wireless microcontroller is a part of the wireless interface subsystem 1941 in FIG. 19). The compute subsystem is functionally and physically divided into two parts a base vehicle compute 2046 and an autonomous mobility compute 2053.

The autonomous mobility compute 2053 is responsible for autonomy (e.g., perception, localization, navigation), delivery vehicle state and health management, interaction (e.g., cargo, high-level audio and visual), and high-level external communications control. The autonomous mobility compute 2053 is further subdivided into a set of discrete compute modules, system-on-modules (SOMs) 2055A-C which form the core of the autonomy compute and nominally artificial intelligence (AI) accelerators 2056A-C. All of the compute hardware used by the autonomous mobility compute 2053 can be automotive safety integrity level B (ASIL-B) rated with an ASIL-D safety island to give flexibility about the extent of the certified safety system. This includes the ability to isolate safety features with different ASIL levels (A-D or QM) for freedom from interference (FFI).

The base vehicle compute 2046 is responsible for locomotion control and safety, power delivery control, and low-level lighting control. While implemented in one system-on-chip (SoC) it is logically divided into a locomotion safety compute 2047 and a vehicle control compute 2048. The vehicle control compute 2048 performs the nominal functions of control while the locomotion safety compute 2047 monitors and mitigates hazards from incorrect execution of commands from the autonomous mobility compute 2053.

Figure 21:
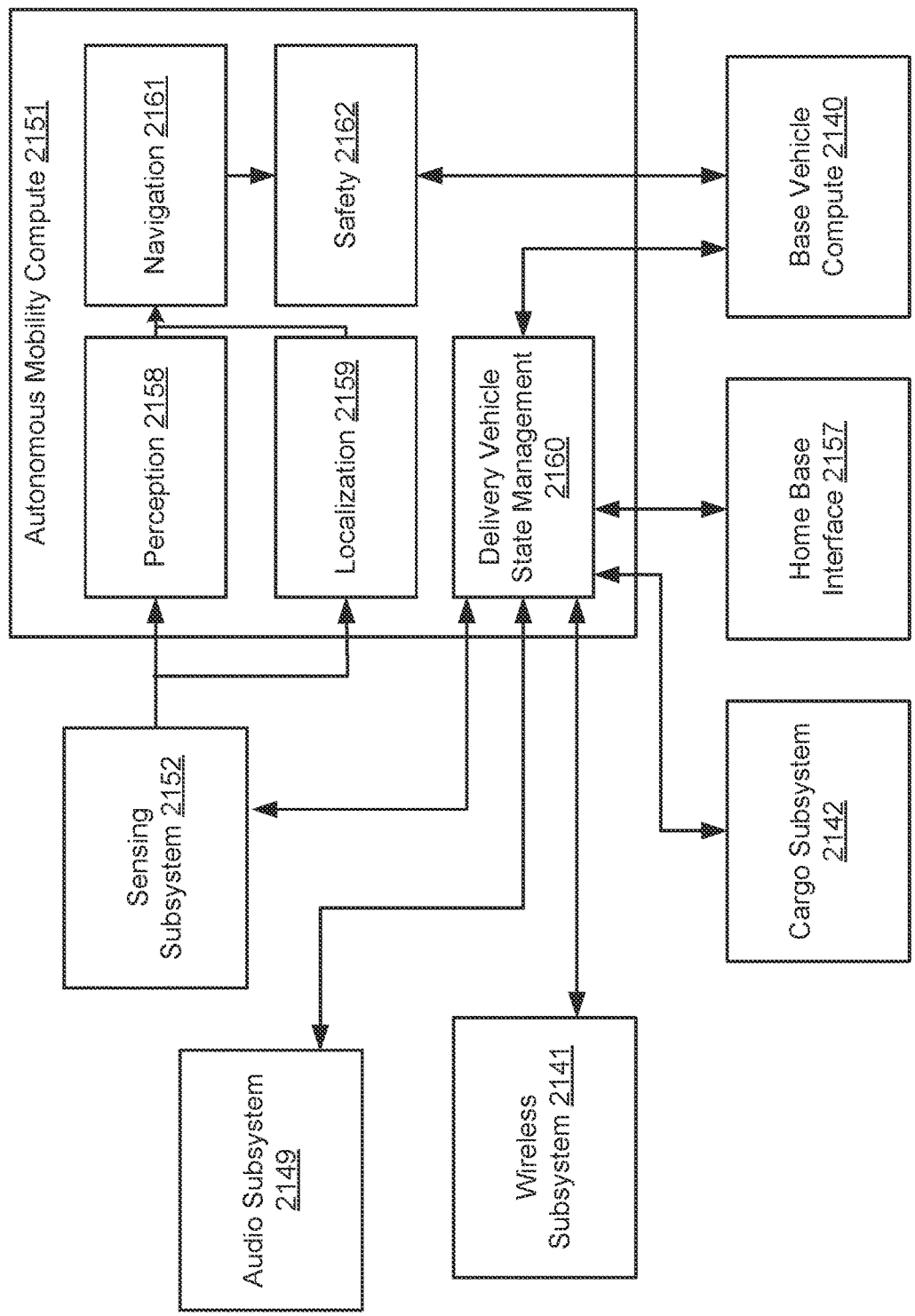
FIG. 21 illustrates an example of autonomous mobility compute interfaces of a delivery vehicle according to an embodiment of the present disclosure.

FIG. 21 illustrates an example of autonomous mobility compute interfaces of a delivery vehicle according to an embodiment of the present disclosure. Functions of an autonomous mobility compute 2151 include executing a delivery vehicle state management subsystem 2160, executing autonomy, controlling an audio subsystem 2149, controlling a wireless subsystem 2141, and controlling a cargo subsystem 2142. To execute autonomy, the autonomous mobility compute 2151 executes a perception subsystem 2158, a localization subsystem 2159, a navigation subsystem 2161, and a safety subsystem 2162. The perception subsystem 2158 can transform sensed data into information about objects and the environment. The localization subsystem 2159 can determine the location and pose of the delivery vehicle in the environment. The navigation subsystem 2161 can plan and generate a route in the environment and related commands for motion. The safety subsystem 2162 can detect and respond for collision avoidance.

Inputs to the autonomous mobility compute 2151 can include LiDAR, radar, camera, global navigation satellite system (GNSS), magnetometer, and/or inertial measurement unit (IMU) data from a sensing subsystem 2152. In addition, the autonomous mobility compute 2151 can receive motion, lighting, state, power, and other telemetry data for higher level system control from a home base interface 2157. The home base interface 2157 can also send updates to software, maps, expeditions, and other on-board data to the autonomous mobility compute 2151. The home base interface 2157 is an assembly that is responsible for enabling the delivery vehicle to receive services from a home base and can be physically located on the bottom surface in the aft section of a chassis of the delivery vehicle. This external interface includes a collection of electrical contact plates that are designed to mate with a similar assembly located at each home base docking station. Other inputs to the autonomous mobility compute 2151 can be audio subsystem state information (e.g., volume) and audio playback state information from the audio subsystem 2149, lid position, latch state information, and auto-close actuator state information from the cargo subsystem 2142, and expedition data and teleoperation and monitoring commands from the wireless subsystem 2141. In order to enable internet access when executing a mission, or when otherwise not docked with home base, the delivery vehicle can be equipped with long-term evolution (LTE) connectivity (or other cellular network connectivity, such as 5G new radio (NRD) connectivity), Bluetooth connectivity, and/or Wi-Fi connectivity. Connection to an external network is enabled by LTE modems located in a rear lid assembly of the delivery vehicle. Access to this interface is in the form of an RF link established between the delivery vehicle and a wireless provider within a given coverage area. Additionally, the delivery vehicle provides connectivity to for local joystick control by an operator in proximity to the robot for support operations.

Outputs of the autonomous mobility compute 2151 can include configuration and control of sensing hardware commands to the sensing subsystem 2152 and motion state commands, desired body motions, desired lighting, states, desired power states, thermal control data, and software update commands to the base vehicle compute 2140. In addition, the autonomous mobility compute 2151 can output audio state control (e.g., volume) and playback control (e.g., track) commands to the audio subsystem 2149, lock, unlock, and auto-close commands to the cargo subsystem 2142, mission data to the home base interface 2157, and health telemetry, expedition feedback, and teleoperation data (e.g., video stream) to the wireless subsystem 2141.

The delivery vehicle state management subsystem 2160 orchestrates delivery vehicle behavior through the transition of discrete states based on input from different control sources, such as autonomy, local joystick, and teleoperations. The delivery vehicle state management subsystem 2160 may have a behavior subsystem that controls the state of the delivery vehicle using a reactive execution model driven by a hierarchically defined behavior tree. As the behavior tree is executed, a signal called a "tick" is propagated through the hierarchy of nodes representing conditional logic branches and actions the delivery vehicle can take. The execution path is dictated by inputs provided through the subscription of messages provided by other subsystems on the delivery vehicle or specific states requested over the Internet of things (IoT) channel provided between the delivery vehicle and a control system in the cloud. For example, when an expedition is started, the behavior subsystem can download a mission payload over the IoT channel and initiate an expedition request, with the desired waypoints, to the navigation subsystem 2161. The navigation subsystem 2161 then issues drive commands and communicates expedition status back to the behavior subsystem to evaluate if a state change is warranted. Commands to drive the delivery vehicle can also come from other sources, such as a locally connected joystick or teleoperations. Ultimately, control commands funnel to a base command where the behavior tree controls which sources to filter. The base command then passes drive commands from the provided sources to the microcontroller (MCU).

The behavior tree provides multiple state transition flows. It initializes with a startup state transition flow. Afterwards, it remains in an idle state, awaiting commands for what to do next. It can receive a request to go to dispenser mode, calibrate sensors, or start an expedition. During an expedition, the behavior subsystem is primarily in the autonomous state, where navigation is allowed to drive the delivery vehicle. If there is a problem with the navigation, the behavior tree can transition to an interrupted state. If navigation arrives as a street crossing, The behavior tree transitions to a waiting to cross state to await approval. When the delivery location is reached, the behavior tree transitions to a delivery wait state await package pickup, after which is transitioned to a completed states signaling completion of the expedition. At any point an operator can stop the delivery vehicle, bring it to a paused state, or engage the parking brake to the hard stopped state. In this stopped state, the behavior subsystem allows the operator to drive the delivery vehicle if requested, either in local or remote joystick states. The behavior subsystem remembers its state before a stop is requested, so when released, the delivery vehicle continues with the original state.

There is a need to ensure that the connection for an ambassador or a remote operator is healthy at all times. If not, the delivery vehicle could drive without anyone monitoring, which would be a safety concern. To do this, a heartbeat is created to assess the health of the remote operator's client connection and a heartbeat to assess the health of the ambassador's joystick connection. The behavior subsystem controls which heartbeat is important for the locomotion MCU to listen to. If locomotion MCU stops receiving a heartbeat, the delivery vehicle will hard stop. The behavior subsystem also assesses the latency of the remote operator's client connection. If it exceeds a defined threshold, the behavior subsystem reduces velocity of the delivery vehicle to a stopped position.

At any time, an ambassador or operator can take control of the delivery vehicle. Control means the ability to control the delivery vehicle via commands like stopping, driving, hatch unlocking etc. Only one actor can be in control at a time, and there can be a prioritization for handling control contention. As an example, the prioritization may be none, local (ambassador), remote (remote operator), and auto (when the delivery vehicle is autonomous). An actor can take control of the robot if their priority is higher than the current actor in control.

Figure 22:
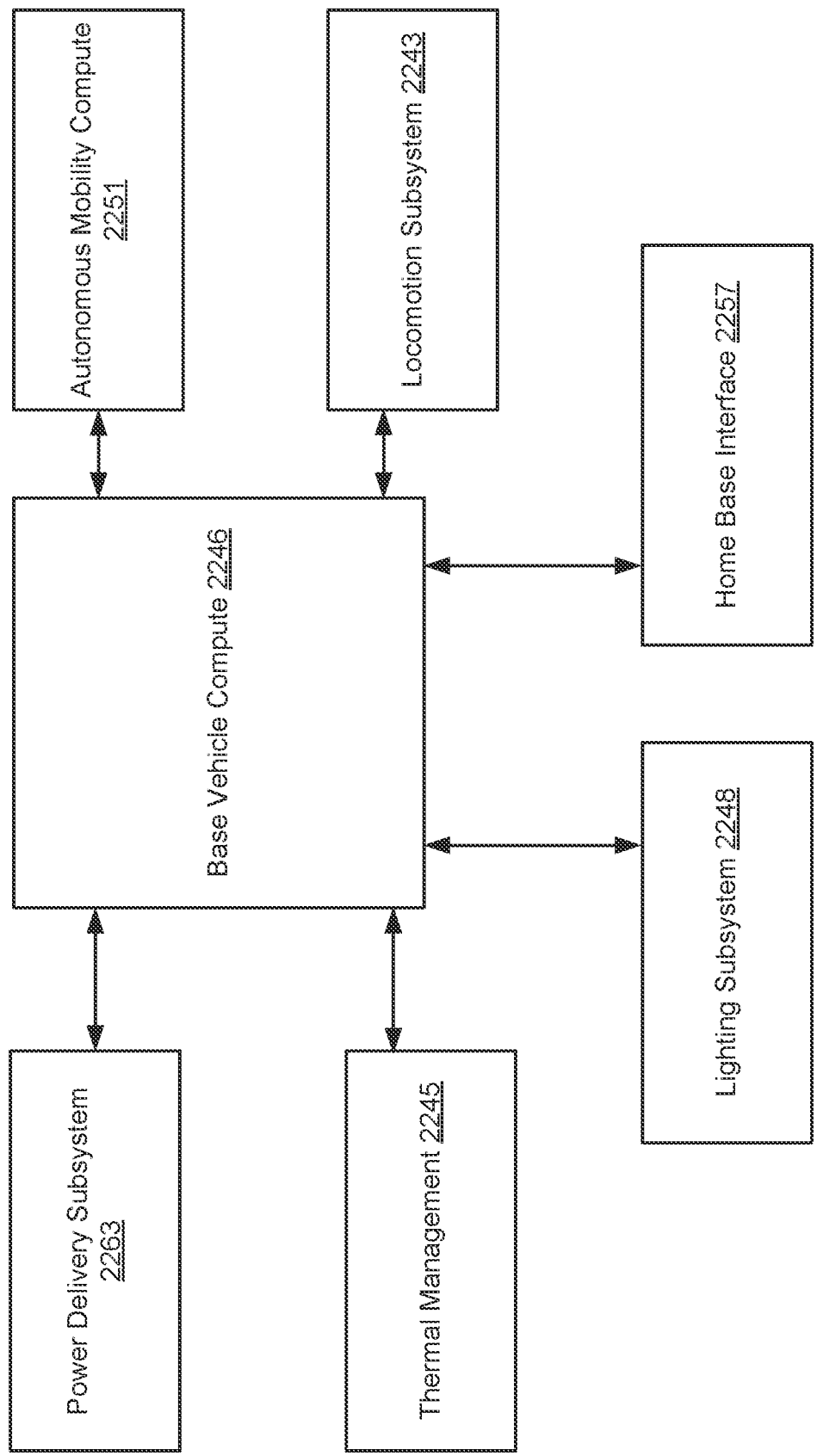
FIG. 22 illustrates an example of base vehicle compute interfaces of a delivery vehicle according to an embodiment of the present disclosure.

FIG. 22 illustrates an example of base vehicle compute interfaces of a delivery vehicle according to an embodiment of the present disclosure. Functions of a base vehicle compute 2246 include control of a power delivery subsystem 2263, control of a locomotion subsystem 2243, control of a thermal management subsystem 2245, debug and test control, and software update management. The power delivery subsystem 2263 can sequence and control regulated power. The locomotion subsystem 2243 can provide actuator control to achieve desired motions. The thermal management subsystem 2245 can control cooling hardware of the delivery vehicle.

Inputs to the base vehicle compute 2246 can include motion state commands, desired body motions, desired lighting states, desired power states, thermal control data, software update commands from a home base interface 2257. The inputs can also include offboard charger control, feedback data, battery state, and telemetry data from the power delivery subsystem 2263. The locomotion subsystem can provide feedback from motor and brake actuation to the base vehicle compute 2246. A lighting subsystem 2248 can provide state feedback from lighting module information to the base vehicle compute 2246.

Outputs of the base vehicle compute 2246 can include motion, lighting, state, power, data for higher level system control to the home base interface 2257, commands for motors and brakes to the locomotion subsystem 2243, and commands for nominal and safety lighting elements of the delivery vehicle to the lighting subsystem 2248. In addition, the outputs can include commands for controlling active cooling elements to the thermal management subsystem 2245 and commands for power conversion and distribution hardware to the power delivery subsystem 2263.

Figure 23:
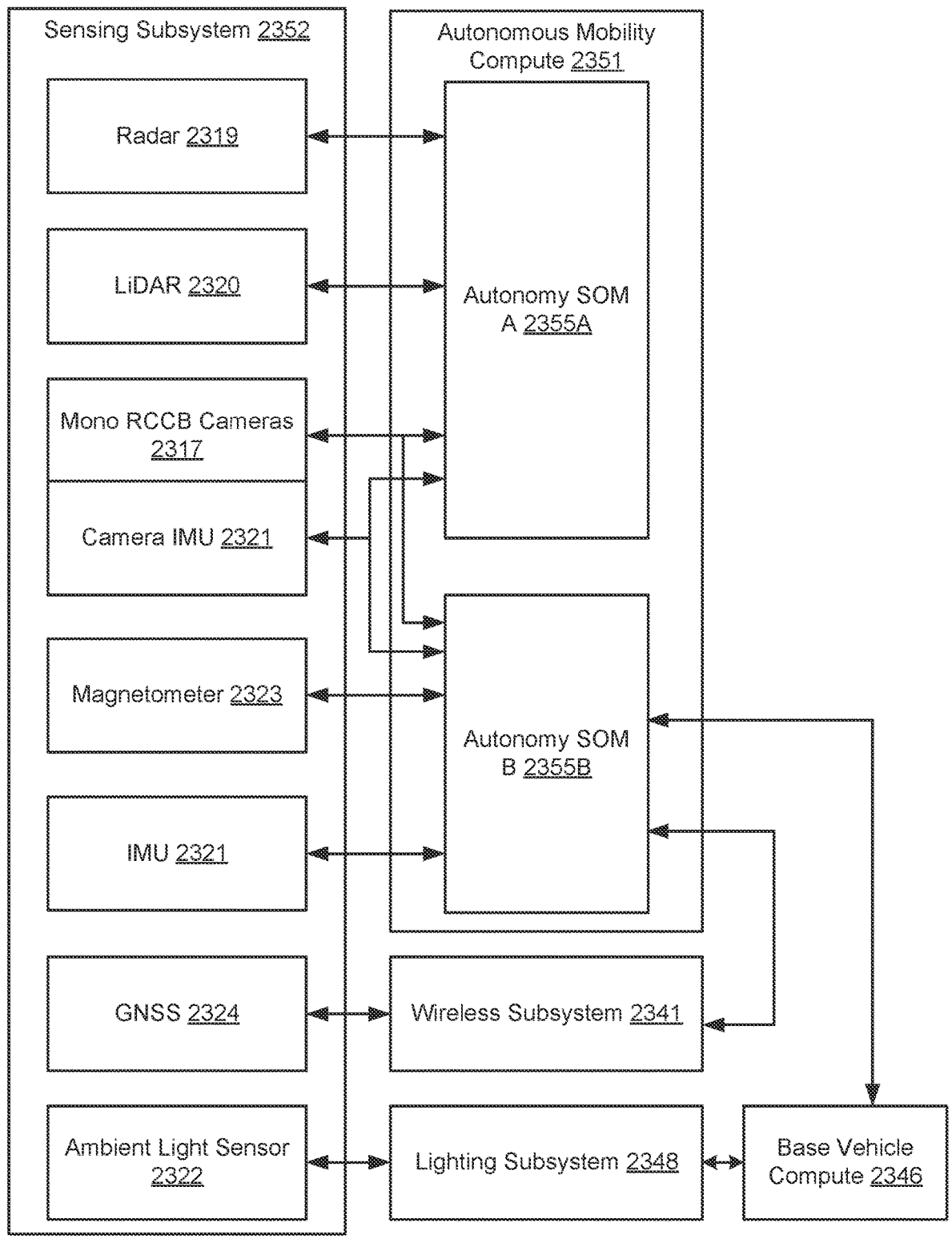
FIG. 23 illustrates an example of sensing subsystem interfaces to compute subsystems of a delivery vehicle according to an embodiment of the present disclosure.

FIG. 23 illustrates an example of sensing subsystem interfaces to compute subsystems of a delivery vehicle according to an embodiment of the present disclosure. A sensing subsystem 2352 includes a LiDAR 2320, a radar 2319, monocular red clear clear blue (RCCB) color cameras 2317, IMUs 2321, a magnetometer 2323, an ambient light sensor 2322, and a GNSS 2324. Subcomponents of the sensing subsystem 2352 can include a magnetometer driver a GNSS driver, an IMU driver, a radar driver, and a LiDAR driver. The radar driver can perform detections with a minimum signal-to-noise ratio from front left, front right, and rear radars sampled at, for example, ten Hz. The LiDAR driver can provide point cloud detections from a front LIDAR sampled at, for example, twenty Hz.

In an example, The GNSS 2324 utilizes Global Positioning System (GPS) or Galileo constellations over L1/2 bands to achieve precise position determinations. An active-filtered antenna (GPSF.36.7.A.30 and low noise amplification chain) design can be implemented to ensure GNSS signal integrity. In addition, the GNSS 2324 supports real-time kinematic positioning (RTK) corrections over cellular network to comply localization requirements.

Figure 24:
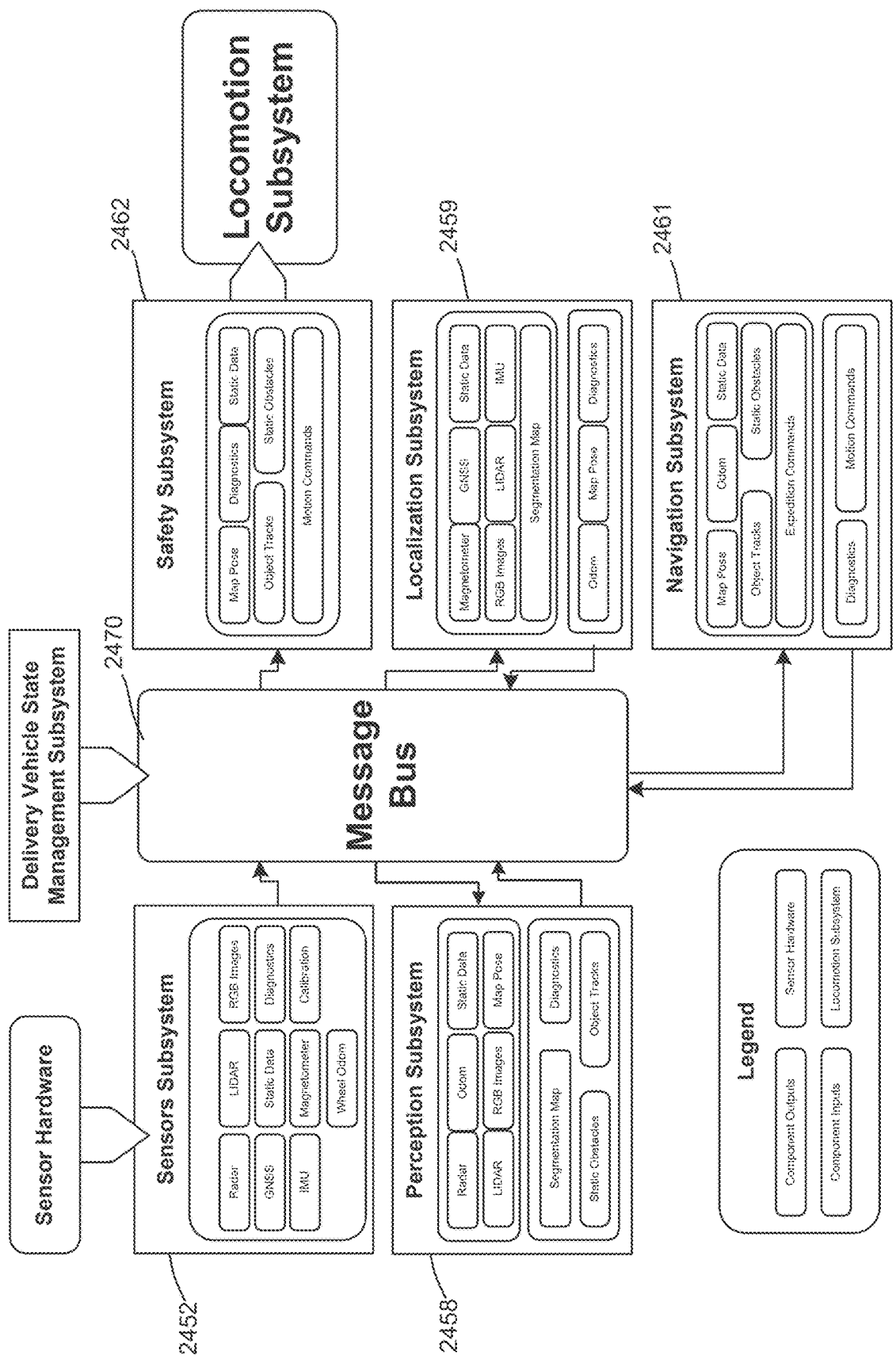
FIG. 24 illustrates an example of an autonomy subsystem overview of a delivery vehicle according to an embodiment of the present disclosure.

FIG. 24 illustrates an example of an autonomy subsystem overview of a delivery vehicle according to an embodiment of the present disclosure. The overall design consists of four core subsystems that communicate via a messaging bus 2470 provided by the middleware. The subsystems include a perception subsystem 2458, a localization subsystem 2459, a navigation subsystem 2461, and a safety subsystem 2462. The perception subsystem 2458 fuses and processes sensor data to provide semantic representations of the area around the delivery vehicle, such as static objects and moving objects. The perception subsystem 2458 can produce a segmentation map of the 360° area around the delivery vehicle that is used by the localization subsystem 2459 to match against offline maps. The perception subsystem 2458 can also produce dynamic object information for moving objects around the delivery vehicle including the estimated location, size, and other metadata (e.g., classification) about the object. In addition, the perception subsystem 2458 can produce information about static objects around the delivery vehicle, for instance in areas that are occluded and may represent a hidden hazard. The perception subsystem 2458 can also produce diagnostics indicating faults or performance metrics of different components of the perception subsystem 2458. This can include hard failures (e.g., sensor information arrived too late, cameras are obscured) or confidence failures (e.g., lack of confidence in the perception map produced or a hard-stop is likely to occur). Each component is responsible for evaluating what it considers acceptable operation criteria and producing a healthy or not healthy decision.

Inputs to the perception subsystem 2458 can include RGB images from the camera driver in a sensor subsystem 2452, a three degrees of freedom (DOF) map pose from the localization subsystem 2459 indicating where the delivery vehicle is on the offline map, offline maps for the environment the delivery vehicle is currently operating in, sensor calibrations to map the sensor measurements to the real world, radar detections and a point cloud from a radar driver in the sensor subsystem 2452, a LiDAR point cloud from a LiDAR driver in the sensor subsystem 2452, and a six DOF odometry for the movement of the delivery vehicle from the localization subsystem 2459.

In an example, components of the perception subsystem 2458 include an image preprocessor that improves the camera images prior to perception, local offline maps that isolate the maps in the local region of the delivery vehicle, geometric reasoning, semantic projection, and dynamic object tracking. The perception subsystem 2458 can also include a sensor fusion network that combines sensor detections and produces a fused output of hard stop predictions, a depth map, a semantic segmentation map, two-dimensional object detections, and three-dimensional object detections.

Outputs of the perception subsystem 2458 include diagnostics about hard failures (e.g., sensor information arrived too late, cameras are obscured) or confidence failures (e.g., lack of confidence in the perception map produced or a hard stop is likely to occur). Each component is responsible for evaluating what it considers acceptable operation criteria and producing a healthy or not healthy decision. Another output can be a segmentation map with a birds-eye view of the area around the delivery vehicle labelled with semantic classification of different types of unknown areas, objects, free space, and terrain. The perception subsystem 2458 can also output dynamic objects that move over time (e.g., pedestrians, cars) and static objects that are not part of the terrain (e.g., garbage cans).

The localization subsystem 2459 fuses and processes sensor data to determine the location, pose, and odometry of the delivery vehicle. In an example, components of the localization subsystem 1459 include a LiDAR slam, LiDAR map matching, semantic map matching, visual three-dimensional map matching, visual inertial odometry, six DOF of odometry fusion, and three DOF of map fusion.

Inputs to the localization subsystem 2459 can include wheel odometry of a measurement of the movement of wheels of the delivery vehicle, a LiDAR point cloud from the LiDAR driver in the sensor subsystem 2452, a segmentation map from the perception subsystem 2458, offline maps for the environment the delivery vehicle is operating in, and RGB images from the camera driver in the sensor subsystem 2452. In addition, the inputs can include GNSS measurements indicating the global position of the delivery vehicle from the sensor subsystem 2452, IMU measurements indicating the velocity and acceleration of the delivery vehicle from the sensor subsystem 2452, magnetometer measurements indicating the direction of the delivery vehicle from the sensor subsystem 2452, and sensor calibrations to map the sensor measurements to the real world.

Outputs of the localization subsystem 2459 can include diagnostics of hard failures (e.g., sensor information arrived too late, cameras are obscured) or confidence failures (e.g., lack of confidence in the location estimation). Each component is responsible for evaluating what it considers acceptable operation criteria and producing a healthy or not healthy decision. The outputs can also include a three DOF map pose indicating where the delivery vehicle is on the offline map and six DOF odometry for the movement of the delivery vehicle.

The navigation subsystem 2461 uses the outputs from the perception subsystem 2458 and the localization subsystem 2459 to plan and execute a local trajectory to avoid obstacles as part of the overall route for the expedition. To navigate to a delivery location from a current position and back to a home base and dock, the navigation subsystem 2461 provides the ability to find a route to a destination using offline map information. The route can involve sidewalk driving, curbside driving, and crossings. The navigation subsystem 2461 can also ask for approvals and perform necessary road entry checks before the delivery vehicle enters the road, plan a reroute if the original route is blocked, command the delivery vehicle to stop or reroute if the movement interferes with other traffic participants. These commands may vary depending on the object class. In addition, the navigation subsystem 2461 can ask for assistance from operators, wake up and stop local planning, break a high-level route into pieces to guide path planning with intermediate goals, send speed constraints to motion planning, and surface errors to upstream components if local planning or high-level planning fails.

In an example, components of the navigation subsystem 1461 involve high-level planning and local planning. The local planning can take a high-level plan (expressed as tuples of (x,y) and some metadata) and Perception's local observations and calculate motion (v, ω) commands to make progress along the high-level plan while avoiding dynamic and static objects. Inputs to the navigation subsystem 2461 can include a three degree of freedom (DOF) map pose indicating where the delivery vehicle is on the offline map from the localization subsystem 2459, six DOF odometry for the movement of the delivery vehicle from the localization subsystem 2459, offline maps, dynamic objects, static objects, a segmentation map, and commands from a delivery vehicle state management subsystem.

Outputs of the navigation subsystem 2461 can include diagnostics of hard failures (e.g., sensor information arrived too late, cameras are obscured) or confidence failures (e.g., lack of confidence in the location estimation). Each component is responsible for evaluating what it considers acceptable operation criteria and producing a healthy or not healthy decision. The outputs can also include motion commands that are to be executed by the safety subsystem 2462 and a delivery vehicle state for the delivery vehicle state management subsystem.

Motor control commands are sent to the safety subsystem 2462, which monitors the health state and confidence monitors of various components of the delivery vehicle and halts the delivery vehicle if any of the safety requirements are violated. Motion control commands are accepted from the navigation subsystem 2461 to check that they are within the current safe operating range before submitting to the locomotion system. Various components in the system publish overall confidence to the middleware. A halt can be triggered by faults detected in the system (e.g., camera hardware fault code), fouling (e.g., camera is obscured) or uncertainty in the autonomy systems (e.g., localization confidence monitors, perception hard stop predictor). In addition to halting the delivery vehicle, the monitors also measure subcritical performance of the delivery vehicle. Over time, the indicators can be used to show differences in performance due to changes in environment or an excursion from the environment and to model drift or unexpected fault modes before they trigger a critical safety fault. Examples of these indicators might be flickering of detections for an object that sensor fusion is able to mitigate but indicate that the system is not performing as it was designed.

Components of the safety subsystem 2462 can involve a diagnostic aggregator, a linear speed limiter, an autonomy halt, and diagnostic logging. The safety subsystem 2462 can provide speed limit enforcement, fault detection from any component in the critical safety path and halting of the delivery vehicle accordingly, and decision making about machine monitoring requirements based on the health and confidence monitoring from diagnostic information. The components may make a distinction between different states of the diagnostic based on monitoring requirements. For example, a first state may not require monitoring by a teleoperator and can operate in a machine monitored state, a second state may need a low level of teleoperator monitoring within a fixed time period, and a third state may require a high level of teleoperator monitoring.

Inputs to the safety subsystem 2462 can include motion commands from the navigation subsystem 2461, six DOF odometry for the movement of the delivery vehicle from the localization subsystem 2459, and diagnostics from all other subsystems. Outputs of the safety subsystem 2462 can include motion control commands to the locomotion subsystem and commands to a behavior subsystem requesting telemonitoring support corresponding to the current state of confidence monitoring.

Figure 25:
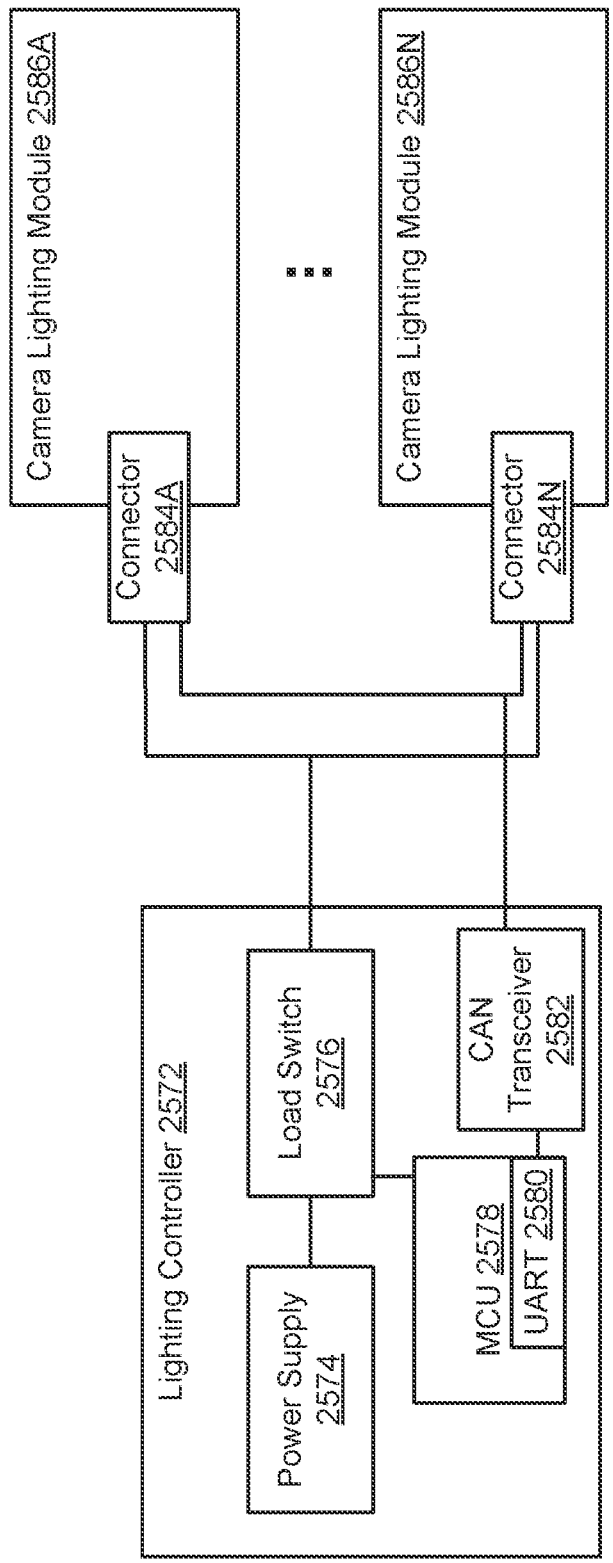
FIG. 25 illustrates an example of an electrical architecture of a lighting controller and lighting modules of a delivery vehicle according to an embodiment of the present disclosure.

FIG. 25 illustrates an example of an electrical architecture of a lighting controller 2572 and camera lighting modules 2586 of a delivery vehicle according to an embodiment of the present disclosure. The lighting controller 2572 is used to control the LED modules distributed around the periphery. The system uses a robust CAN physical layer for fault tolerant communication. The lighting controller 2572 can include a power supply 2574, a load switch 2576, an MCU 2578 with a universal asynchronous receiver/transceiver (UART) 2580, and a CAN transceiver 2582.

Figure 26:
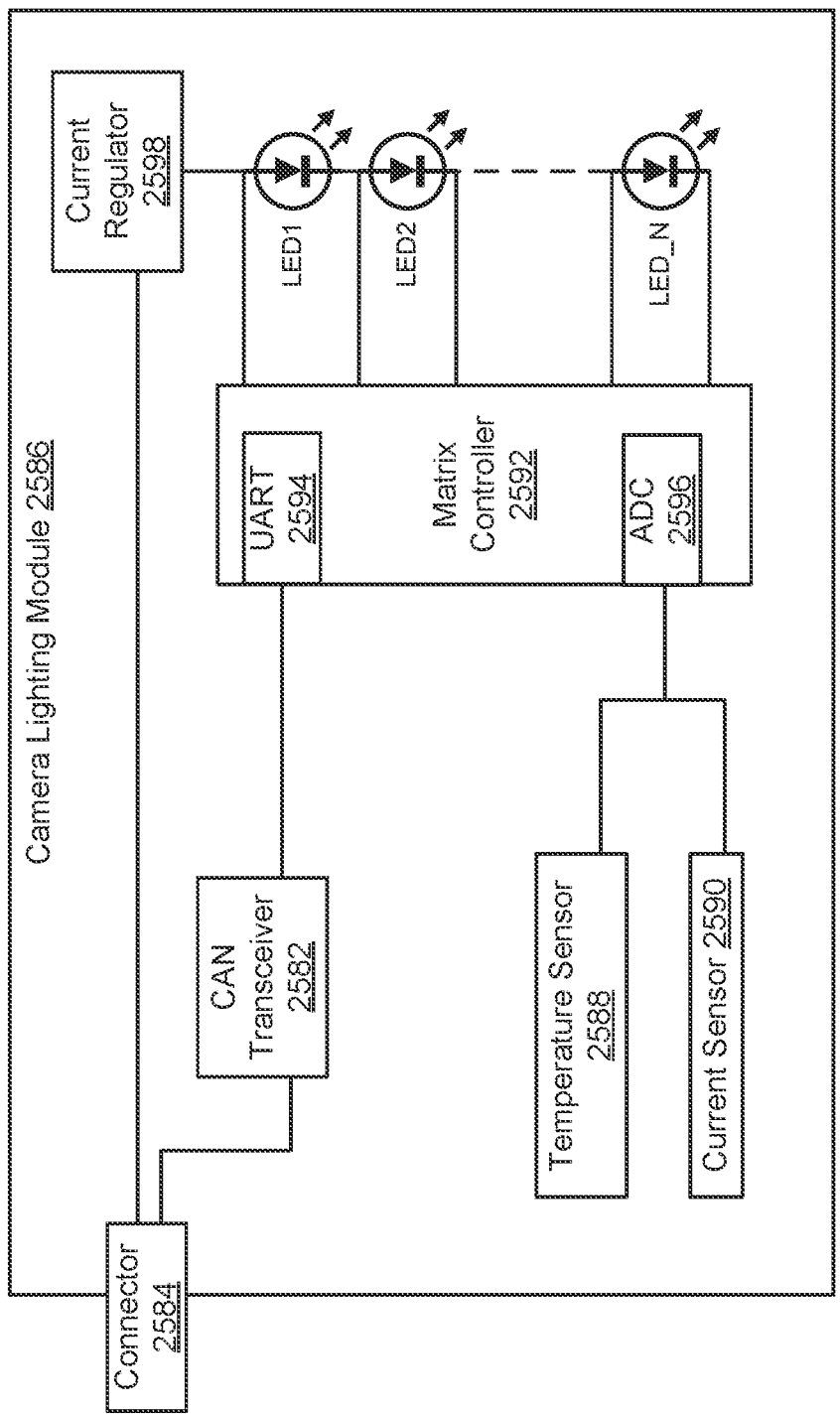
FIG. 26 illustrates an example of electrical components of a delivery vehicle according to an embodiment of the present disclosure.

The lighting controller 2572 can communicate with connectors 2584 of the camera lighting modules 2586. As shown in FIG. 26, each camera lighting module 2586 can consist of a simple printed circuit board with LEDs, a current regulator 2598, a temperature sensor 2588, and a current sensor 2590, which can work together for brightness control, fault handling, and temperature feedback. The peripheral boards receive commands from the lighting controller 2572 via a CAN transceiver 2582 over the CAN interface. The design can minimize emissions in GPS and LTE frequency bands, for example. The camera lighting modules 2586, each individually addressable, act as a client device on the CAN bus, responding to commands initiated by the lighting controller 2572. The specific address of each camera lighting module 2586 is determined by the presence of pull/down resistors on the address pins of a matrix controller 2592. The matrix controller 2592 includes a UART 2594 and an analog-to-digital converter (ADC) 2596. The typical operating mode for the camera lighting modules 2586 is continuous operation at full brightness. A camera lighting module 2586 may turn on/off or adjust brightness of individual pixel LEDs upon receipt of commands from the lighting controller 2572. The matrix controller 2592 can modulate the power of the lights. This is to provide different light levels for different mission states: full brightness for operating at maximum speed, half brightness for navigating in proximity to people or navigating obstacles at low speed, and low brightness waiting for assisted delivery after dusk. Light operation is to be controlled by a combination of date, time, and latitude (on from dusk to dawn), and during the daytime in response to ambient levels as measured by an ambient light sensor located in the top surface of a mast.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A delivery vehicle comprising:
   a chassis; and
   a cargo bay mounted to the chassis and having a front side and a back side;
   a front sensor system mounted to the front side and comprising:
      a first housing comprising a front wall that is parallel to the front side, a first angled wall that intersects the front wall and the front side, and a second angled wall that intersects the front wall and the front side,
      a first monocular camera, a first radar, and a first light source that are installed in the first housing and that have corresponding first openings in the first angled wall, the first radar mounted below the first monocular camera, the first light source mounted above the first monocular camera,
      a second monocular camera, a second radar, and a second light source that are installed in the first housing and that have corresponding second openings in the second angled wall, the second radar mounted below the second monocular camera, the second light source mounted above the second monocular camera, and
      a third monocular camera and a LiDAR that are installed in the first housing and that have corresponding third openings in the front wall, the LiDAR mounted below the third monocular camera; and
   a back sensor system mounted to the back side and comprising:
      a second housing comprising a back wall that is parallel to the back side, a third angled wall that intersects the back wall and the back side, and a fourth angled wall that intersects the back wall and the back side,
      a fourth monocular camera and a third light source that are installed in the second housing and that have corresponding fourth openings in the third angled wall, the third light source mounted above the fourth monocular camera,
      a fifth monocular camera and a fourth light source that are installed in the second housing and that have corresponding fifth openings in the fourth angled wall, the fourth light source mounted above the fifth monocular camera, and
      a sixth monocular camera and a third radar that are installed in the second housing and that have corresponding sixth openings in the back wall, the third radar mounted below the sixth monocular camera.

2. The delivery vehicle of claim 1, wherein the cargo bay is mounted to the chassis along a first plane, wherein the front sensor system is mounted to the front side along a second plane that intersects the first plane, and wherein the first monocular camera, the second monocular camera, the third monocular camera, the fourth monocular camera, the fifth monocular camera, and the sixth monocular camera have a first collective 360° field of view along the first plane.

3. The delivery vehicle of claim 2, wherein the first radar, the second radar, and the third radar have a second collective 360° field of view along the first plane.

4. The delivery vehicle of claim 1, wherein the first monocular camera, the second monocular camera, the third monocular camera, the fourth monocular camera, the fifth monocular camera, and the sixth monocular camera form pairs of adjacent cameras, wherein cameras in each one of the pairs have overlapping fields of view.

5. The delivery vehicle of claim 1, wherein:
the chassis comprises a field replaceable unit, a connector unit, and a power storage unit,
the field replaceable unit comprises a first waterproof-sealed enclosure that contains a first set of printed circuit boards and a first connector that is electrically coupled with the first set of printed circuit boards,
the connector unit comprises a second waterproof-sealed enclosure that contains a second set of printed circuit boards having connectors that receive electrical cables, the connector unit further containing a second connector configured to mate with the first connector and electrically coupled to the electrical cables via the second set of printed circuit boards,
the power storage unit comprising a third waterproof-sealed enclosure that contains a set of batteries, and
the connector unit is disposed between the field replaceable unit and the power storage unit.

6. The delivery vehicle of claim 1 further comprising:
a mast mounted to the back side of the cargo bay and through at least a top surface of the second housing of the back sensor system, wherein the mast comprises: a fifth light source that faces the back side, a sixth light source that faces an opposite direction of the fifth light source, and an ambient light sensor positioned above the fifth light source and the sixth light source.

7. A system comprising:
a cargo bay mounted to a chassis; and
a sensor system mounted to the cargo bay and comprising:
a plurality of cameras that have a first continuous 360° field of view along a first plane and that form pairs of adjacent cameras, wherein cameras in each one of the pairs have overlapping fields of view along the first plane; and
a plurality of light sources configured to emit light along the first continuous 360° field of view, wherein a first light source of the plurality of light sources is mounted adjacent to a first camera of the plurality of cameras.

8. The system of claim 7, wherein the sensor system further comprises:
a plurality of radars that have a second continuous 360° field of view along the first plane, wherein a first radar of the plurality of radar is mounted adjacent to the first camera.

9. The system of claim 8, wherein the first camera comprises a camera lens that is oriented downwardly, wherein the first light source is mounted above the first camera, and wherein the first radar is mounted below the first camera.

10. The system of claim 8, wherein the sensor system comprises a housing, wherein the first radar comprises an antenna unit that is installed unobstructedly in an opening in the housing.

11. The system of claim 7, wherein the sensor system further comprises:
a LiDAR that is mounted adjacent to a second camera of the plurality of cameras.

12. The system of claim 7, wherein the sensor system comprises a front sensor system mounted to a front side of the cargo bay, wherein the front sensor system comprises:
a first housing comprising a front wall that is parallel to the front side, a first angled wall that intersects the front wall and the front side, and a second angled wall that intersects the front wall and the front side,
the first camera and the first light source are installed in the first housing and have corresponding first openings in the first angled wall,
a second camera of the plurality of cameras and a second light source of the plurality of light sources, wherein the second camera and the second light source are installed in the first housing and have corresponding second openings in the second angled wall, and
a third camera of the plurality of cameras, wherein the third camera is installed in the first housing and has a corresponding third opening in the front wall.

13. The system of claim 12, wherein the sensor system comprises a back sensor system mounted to a back side of the cargo bay, wherein the back sensor system comprises:
a second housing comprising a back wall that is parallel to the back side, a third angled wall that intersects the back wall and the back side, and a fourth angled wall that intersects the back wall and the back side,
a fourth camera of the plurality of cameras and a third light source of the plurality of light sources, wherein the fourth camera and the third light source are installed in the second housing and have corresponding fourth openings in the third angled wall,
a fifth camera of the plurality of cameras and a fourth light source of the plurality of light sources, wherein the fifth camera and the fourth light source are installed in the second housing and have corresponding fifth openings in the fourth angled wall, and
a sixth camera of the plurality of cameras, wherein the sixth camera is installed in the second housing and has a corresponding sixth opening in the back side.

14. The system of claim 13, wherein the front sensor system further comprises a first radar installed in the first angled wall, a second radar installed in the second angled wall, and a LiDAR installed in the front wall, and wherein the back sensor system further comprises a third radar installed in the back wall.

15. The system of claim 13, wherein the first housing further comprises a sound module mounted between the third camera and a LiDAR of the front sensor system.

16. An assembly comprising:
a chassis;
a cargo bay mounted to the chassis; and
a sensor system mounted to the cargo bay and comprising:
a plurality of cameras that have a first continuous 360° field of view along a first plane and that form pairs of adjacent cameras, wherein cameras in each one of the pairs have overlapping fields of view along the first plane; and
a plurality of light sources configured to emit light along the first continuous 360° field of view, wherein a first light source of the plurality of light sources is mounted adjacent to a first camera of the plurality of cameras.

17. The assembly of claim 16, wherein the chassis comprises a field replaceable unit, wherein the field replaceable unit comprise a first waterproof-sealed enclosure that contains a first set of printed circuit boards and a first connector that is electrically coupled with the first set of printed circuit boards, wherein a first printed circuit board of the first set is configured to process sensor data of the sensor system.

18. The assembly of claim 17, wherein the chassis further comprises a connector unit, wherein the connector unit comprises a second waterproof-sealed enclosure that contains a second set of printed circuit boards having connectors that receive electrical cables, and wherein the connector unit further contains a second connector configured to mate with the first connector and electrically coupled to the electrical cables via the second set of printed circuit boards.

19. The assembly of claim 18, wherein the chassis further comprises a frame, wherein the field replaceable unit and the connector unit are mounted to the frame, and wherein the frame comprises electrical wire routing attachments.

20. The assembly of claim 18, wherein the first connector and the second connector are configured to mate along a first plane, wherein an installation of the first printed circuit board in the first waterproof-sealed enclosure along a second plane that intersects the first plane, wherein the installation includes a grommet disposed in a hole of the first printed circuit board and a shank inserted in the grommet in a direction of the first plane such that translational movement of the first printed circuit board is allowed within the first waterproof-sealed enclosure along the second plane upon a mating of the first connector and the second connector.

\* \* \* \* \*